US012703188B2

(12) United States Patent
Kawabe et al.

(10) Patent No.: US 12,703,188 B2
(45) Date of Patent: Aug. 11, 2026

(54) INK JET RECORDING METHOD, AND INK JET RECORDING APPARATUS

(71) Applicant: CANON KABUSHIKI KAISHA, Tokyo (JP)

(72) Inventors: Minako Kawabe, Tokyo (JP); Masaya Asao, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 193 days.

(21) Appl. No.: 18/471,892

(22) Filed: Sep. 21, 2023

(65) Prior Publication Data

US 2024/0100854 A1 Mar. 28, 2024

(30) Foreign Application Priority Data

Sep. 22, 2022 (JP) ................................ 2022-151700
Sep. 5, 2023 (JP) ................................ 2023-143896

(51) Int. Cl.
*B41J 2/18* (2006.01)
*B41J 2/175* (2006.01)
*B41J 29/377* (2006.01)

(52) U.S. Cl.
CPC ............ *B41J 2/18* (2013.01); *B41J 2/17523* (2013.01); *B41J 29/377* (2013.01)

(58) Field of Classification Search
CPC ........................................................ B41J 2/18
See application file for complete search history.

(56) References Cited

U.S. PATENT DOCUMENTS

| | | | |
|---|---|---|---|
| 7,208,033 | B2 | 4/2007 | Kawabe et al. |
| 7,244,299 | B2 | 7/2007 | Tsuji et al. |
| 7,297,194 | B2 | 11/2007 | Shinjo et al. |
| 7,364,770 | B2 | 4/2008 | Nagashima et al. |
| 7,445,666 | B2 | 11/2008 | Yanagimachi et al. |

(Continued)

FOREIGN PATENT DOCUMENTS

| | | | |
|---|---|---|---|
| CN | 111016435 | A | 4/2020 |
| CN | 113755056 | A | 12/2021 |

(Continued)

OTHER PUBLICATIONS

European Search Report issued in corresponding European Application No. 23198103.6 dated Feb. 20, 2024.

(Continued)

*Primary Examiner* — Shelby L Fidler
(74) *Attorney, Agent, or Firm* — Venable LLP

(57) ABSTRACT

To provide an inkjet recording method capable of recording images with good ink ejection stability and excellent abrasion resistance while circulating ink between the ink storage portion and the recording head over a long period of time. An ink jet recording method in which an aqueous ink is ejected from a recording head and applied to a recording medium to record an image, the ink jet recording method uses an ink jet recording apparatus equipped with an ink circulation flow path for circulating the aqueous ink from an ink storage portion to the recording head, including the ink storage portion for storing the aqueous ink, the recording head of an ink jet system for ejecting the aqueous ink, a cooling portion for cooling the aqueous ink, a heating portion for heating the aqueous ink, and a pump for circulating the aqueous ink.

20 Claims, 6 Drawing Sheets

(56) References Cited

U.S. PATENT DOCUMENTS

| | | | | |
|---|---|---|---|---|
| 7,618,484 | B2 | 11/2009 | Fujimoto et al. | |
| 7,637,603 | B2 | 12/2009 | Kawabe et al. | |
| 8,025,722 | B2 | 9/2011 | Kawabe et al. | |
| 8,070,871 | B2 | 12/2011 | Kawabe et al. | |
| 8,163,360 | B2 | 4/2012 | Asao et al. | |
| 8,247,042 | B2 | 8/2012 | Asakawa et al. | |
| 8,247,043 | B2 | 8/2012 | Tanaka et al. | |
| 8,252,393 | B2 | 8/2012 | Nagashima et al. | |
| 8,343,269 | B2 | 1/2013 | Takahashi et al. | |
| 8,545,008 | B2 | 10/2013 | Asao et al. | |
| 8,602,544 | B2 | 12/2013 | Kawabe et al. | |
| 8,814,341 | B2 | 8/2014 | Nagao et al. | |
| 8,871,013 | B2 | 10/2014 | Sakai et al. | |
| 9,574,099 | B2 | 2/2017 | Kawabe et al. | |
| 9,975,340 | B2 | 5/2018 | Karita et al. | |
| 10,093,119 | B2 | 10/2018 | Nagase et al. | |
| 10,150,318 | B2 | 12/2018 | Ota et al. | |
| 10,166,803 | B2 | 1/2019 | Herlambang et al. | |
| 10,233,343 | B2 | 3/2019 | Takebayashi et al. | |
| 10,253,200 | B2 | 4/2019 | Kakikawa et al. | |
| 10,603,909 | B2 | 3/2020 | Kawabe et al. | |
| 10,654,288 | B2 | 5/2020 | Nakata et al. | |
| 10,723,135 | B2 | 7/2020 | Kawabe et al. | |
| 10,843,482 | B2 | 11/2020 | Aikawa et al. | |
| 10,843,483 | B2 | 11/2020 | Saito et al. | |
| 10,864,747 | B2 | 12/2020 | Nakagawa et al. | |
| 10,870,770 | B2 | 12/2020 | Sakai et al. | |
| 11,001,066 | B2 | 5/2021 | Motomura et al. | |
| 2006/0152541 | A1* | 7/2006 | Isozaki | B41J 2/04593 347/17 |
| 2009/0015619 | A1* | 1/2009 | Chang | B41J 2/175 347/17 |
| 2009/0256870 | A1* | 10/2009 | Nakamura | B41J 29/377 347/17 |
| 2010/0283808 | A1* | 11/2010 | Terakado | B41J 2/18 347/6 |
| 2011/0025751 | A1* | 2/2011 | Hashi | B41J 2/175 347/17 |
| 2012/0194621 | A1 | 8/2012 | Ikegami et al. | |
| 2015/0022572 | A1* | 1/2015 | Nishiyama | B41J 29/393 347/7 |
| 2015/0070429 | A1* | 3/2015 | Takahashi | B41J 2/0454 347/14 |
| 2019/0009564 | A1* | 1/2019 | Fujikake | B41J 2/18 |
| 2019/0010345 | A1* | 1/2019 | Sakai | B41J 2/2107 |
| 2020/0290344 | A1* | 9/2020 | Izawa | B41J 2/185 |
| 2021/0129569 | A1* | 5/2021 | Fujita | C09D 11/037 |
| 2021/0300026 | A1* | 9/2021 | Yoshida | B41J 2/14088 |
| 2021/0371687 | A1 | 12/2021 | Ishida | |
| 2022/0134777 | A1* | 5/2022 | Komamiya | B41J 3/543 400/120.01 |

FOREIGN PATENT DOCUMENTS

| | | | |
|---|---|---|---|
| EP | 3425014 | A1 | 1/2019 |
| JP | 2006249337 | A | 9/2006 |
| JP | 2007296640 | A | 11/2007 |
| JP | 2014065241 | A | 4/2014 |
| JP | 2018043511 | A | 3/2018 |

OTHER PUBLICATIONS

Chinese Office Action issued in corresponding Chinese Application No. 202311231381.X dated Apr. 22, 2026.

* cited by examiner

INK JET RECORDING METHOD, AND INK JET RECORDING APPARATUS

BACKGROUND OF THE INVENTION

Field of the Invention

The present invention relates to an ink jet recording method, and an ink jet recording apparatus.

Description of the Related Art

Recently, ink jet recording apparatuses are increasingly used in office printing and commercial printing fields. Further, in the ink jet recording apparatus, there is a need to further increase a recording speed as well as ability to record images with excellent robustness such as abrasion resistance.

To maintain ink ejection stability at high level even when recording at a high speed, for example, there is a method to use ink that has been warmed to reduce its viscosity. There is also a method to configure an ink circulation flow path that circulates ink from the ink storage portion to the recording head in order to prevent the ink in the vicinity of an ejection orifice from becoming thicker due to evaporation of liquid components and causing non-ejection. For example, in order to record images in which whiteout is suppressed while improving ink ejection properties, an image forming method using an apparatus equipped with an ink circulation system that controls the temperature of the ink when it is filled in the recording head and when it is ejected from the recording head has been proposed (Japanese Patent Application Laid-Open No. 2014-065241).

To improve the abrasion resistance of recorded images, for example, ink containing a resin particle can be used. For example, in order to record images with excellent abrasion resistance while circulating ink at a constant flow rate, an ink ejecting method using an ink ejection apparatus equipped with an ink circulation system that circulates ink containing a resin particle and in which viscosity rise during evaporation of liquid components is suppressed has been proposed (Japanese Patent Application Laid-Open No. 2018-043511).

SUMMARY OF THE INVENTION

To record images with excellent abrasion resistance at high speed, the inventors studied a method for recording images by using an apparatus equipped with the ink circulation system and by circulating ink containing a resin particle into the ink circulation system as proposed in Japanese Patent Application Laid-Open No. 2014-065241 and Japanese Patent Application Laid-Open No. 2018-043511. As a result, it was found that when the ink is circulated for a long period of time, the ejection state gradually becomes unstable and the ejection stability of the ink tends to deteriorate.

Accordingly, an object of the present invention is to provide an ink jet recording method that can record an image with good ink ejection stability and excellent abrasion resistance while circulating ink for a long period of time from the ink storage portion to the recording head. In addition, another object of the present invention is to provide an ink jet recording apparatus to be used in the ink jet recording method.

According to the present invention, there can be provided the ink jet recording method in which an aqueous ink is ejected from a recording head and applied to a recording medium to record an image, the ink jet recording method uses an ink jet recording apparatus equipped with an ink circulation flow path for circulating the aqueous ink from an ink storage portion to the recording head, including the ink storage portion for storing the aqueous ink, the recording head of an ink jet system for ejecting the aqueous ink, a cooling portion for cooling the aqueous ink, a heating portion for heating the aqueous ink, and a pump for circulating the aqueous ink, wherein the cooling portion, the pump, the heating portion and the recording head, those constitute the ink circulation flow path, are equipped in this order and wherein the aqueous ink comprises a resin particle.

Further features of the present invention will become apparent from the following description of exemplary embodiments with reference to the attached drawings.

DESCRIPTION OF THE EMBODIMENTS

Figure 1:
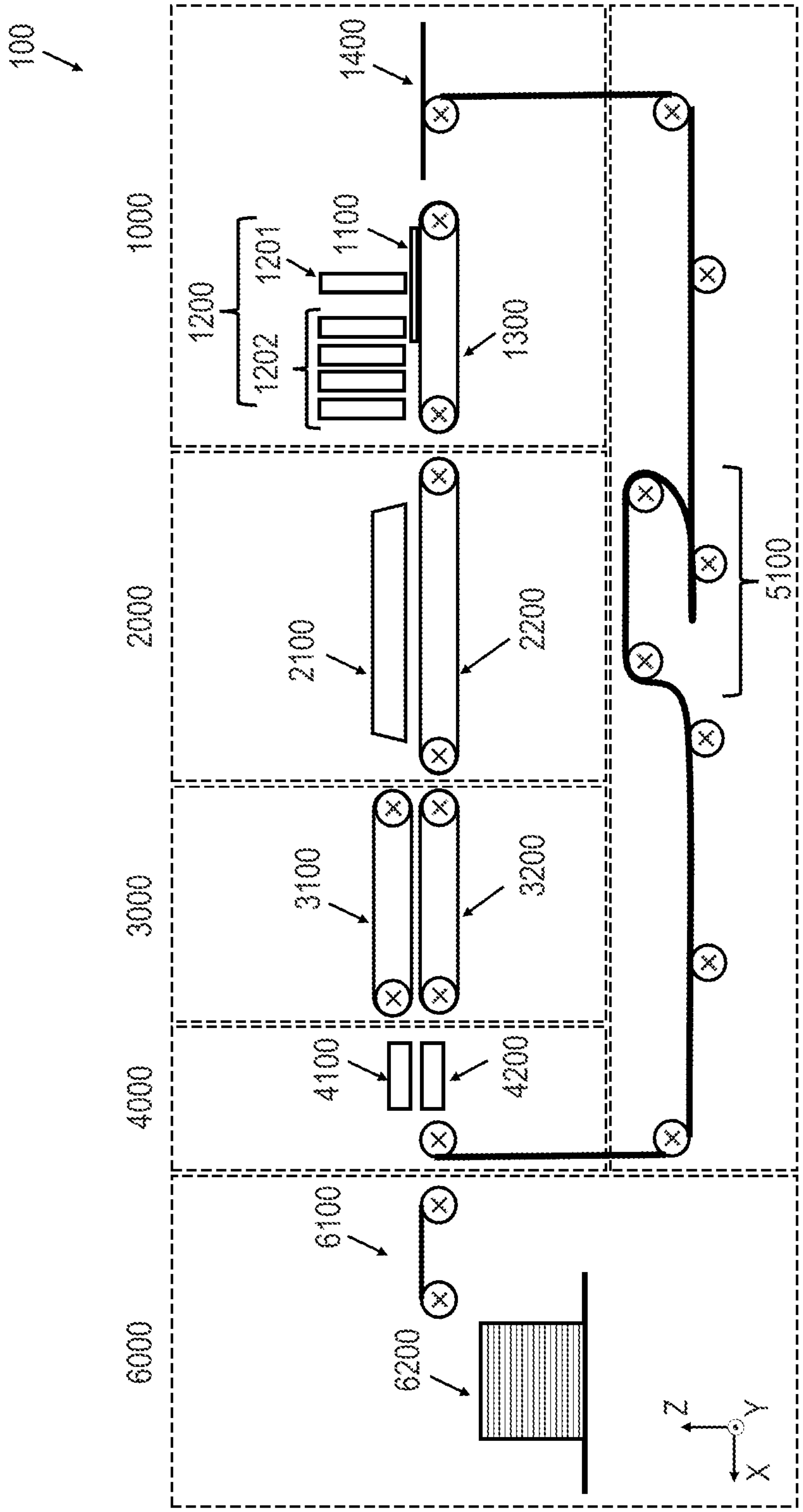
FIG. 1 is a schematic view for illustrating an ink jet recording apparatus according to one embodiment of the present invention.

The present invention is described in more detail below by way of exemplary embodiments. In the present invention, when a compound is a salt, the salt is present as dissociated ions in an ink, but the expression "contain a salt" is used for convenience. In addition, an aqueous ink and reaction liquid for ink jet are sometimes referred to simply as "ink" and "reaction liquid". Physical property values are values at normal temperature (25° C.), unless otherwise stated. The descriptions "(meth)acrylic acid" and "(meth)acrylate" refer to "acrylic acid or methacrylic acid" and "acrylate or methacrylate", respectively.

The inventors studied a method that can record an image with good ink ejection stability and excellent abrasion resistance while circulating ink for a long period of time in the circulation flow path from the ink storage portion to the recording head. As a result, it was found that the impact applied to the ink from the pump for circulating the ink in the flow path when the ink passed through the pump caused the resin particle in the ink to aggregate, resulting in a larger particle size or film formation, which impedes the flow of the ink and the ejection state tends to become unstable.

The degree of aggregation of resin particles varies depending on the circulation flow rate and the circulation temperature of the ink. For example, the higher the ink circulation flow rate, the easier the resin particle aggregates. In addition, the higher the ink circulation temperature, the easier the resin particle aggregates. First, the inventors studied a method to lower the ink circulation flow rate and a method to change the pump for circulation. However, although it is possible to suppress the aggregation of the resin particle by these methods, it was found that when images are recorded at a high speed, in other words, when the ink is ejected at a higher frequency, the ink flow rate is insufficient and the ejection state become unstable in some cases. Next, the inventors studied the circulation temperature of the ink. By lowering the circulation temperature of the ink, the aggregation of the resin particle can be suppressed. However, it has been found that in some cases when lowering the circulation temperature, the viscosity of the ink at the time of ejection becomes high and the ejection state tends to become unstable.

Therefore, instead of maintaining the ink circulation temperature at a constant level, the inventors studied controlling the ink circulation temperature by providing a cooling portion for cooling the ink and a heating portion for heating the ink in the ink circulation flow path. As a result, they found the control wherein the temperature of the ink supplied to the pump is lowered and the temperature of the ink ejected from the recording head is raised. That is, if the ink supplied to the pump is cooled, even if an impact is applied to the ink when it passes through the pump for circulating the ink in the flow path, ejection stability can be maintained good by restraining large particle size and filming due to aggregation of resin particle. And by heating the ink later, the viscosity can be suppressed low, and images with excellent abrasion resistance can be recorded without impairing the ejection stability. In this way, even if the ink containing resin particle is circulated for a long period of time, an image with good ink ejection stability and excellent abrasion resistance can be recorded.

Ink Jet Recording Method, and Ink Jet Recording Apparatus

An ink jet recording method (hereinafter also simply referred to as "recording method") of the present invention is an ink jet recording method that uses an ink jet recording apparatus with an ink circulation flow path to record images by ejecting aqueous ink from a recording head and applying the ink to a recording medium. The ink circulation flow path is a flow path through which the aqueous ink circulates from an ink storage portion to a recording head. The ink circulation flow path includes an ink storage portion for storing the aqueous ink, a recording head of an ink jet system for ejecting the aqueous ink, a cooling portion for cooling the aqueous ink, a heating portion for heating the aqueous ink, and a pump for circulating the aqueous ink. The cooling portion, the pump, the heating portion and the recording head, those constitute the ink circulation flow path, are equipped in this order. And the aqueous ink comprises a resin particle.

An ink jet recording apparatus (hereinafter also simply referred to as "recording apparatus") of the present invention is an ink jet recording apparatus equipped with an ink circulation flow path for circulating an aqueous ink from an ink storage portion to a recording head. The ink circulation flow path includes an ink storage portion for storing the aqueous ink, a recording head of an ink jet system for ejecting the aqueous ink, a cooling portion for cooling the aqueous ink, a heating portion for heating the aqueous ink, and a pump for circulating the aqueous ink. The cooling portion, the pump, the heating portion and the recording head, those constitute the ink circulation flow path, are equipped in this order. And the aqueous ink comprises a resin particle.

Ink Jet Recording Apparatus

Details about the ink jet recording apparatus are described below with reference to the drawings. FIG. 1 is a schematic view for illustrating the ink jet recording apparatus according to one embodiment of the present invention. The ink jet recording apparatus of this embodiment is an ink jet recording apparatus that records an image on a recording medium with a reaction liquid containing a reactant that reacts with an ink and the ink. An X-direction, a Y-direction and a Z-direction represent the width direction (total length direction), depth direction and height direction of the ink jet recording apparatus, respectively. The recording medium is conveyed in the X-direction.

An ink jet recording apparatus 100 of the embodiment illustrated in FIG. 1 includes: a recording portion 1000; a heating portion 2000; a fixing portion 3000; a cooling portion 4000; a reversing portion 5000; and a sheet delivery portion 6000. In the recording portion 1000, various liquids are applied to a recording medium 1100, which has been conveyed from a sheet feeding device 1400 by a conveying member 1300, by a liquid applying device 1200. In the heating portion 2000, the heating of the liquids applied to the recording medium 1100 by a heating device 2100 evaporates volatile components in the liquids such as moisture, to thereby dry the liquids. In the fixing portion 3000, a fixing member 3100 is brought into contact with the region of the recording medium 1100 having applied thereto the liquids to heat the region, to thereby accelerate the fixation of an image to the recording medium 1100. After that, the recording medium 1100 is cooled by the cooling member 4100 of the cooling portion 4000. When an image is to be recorded on the rear surface of the recording medium subsequently to the front surface (recording surface) thereof, first, the recording medium 1100 is reversed by the reversing device 5100 of the reversing portion 5000. Next, after the image has been recorded on the rear surface as in the case of the front surface, the recording medium is conveyed by the conveying member 6100 of the sheet delivery portion 6000 and is loaded and stored in a recording medium storage portion 6200.

Any recording medium may be used as the recording medium 1100. For example, such recording media each having ink absorbability (permeability) as described below may each be used: a recording medium free of a coating layer, such as plain paper uncoated paper or synthetic paper; and a recording medium including a coating layer, such as printing paper, glossy paper or art paper. In addition, a recording medium that does not have permeability like a film or a sheet formed from a resin material, such as polyvinyl chloride (PVC) or polyethylene terephthalate (PET), may be used. The basis weight ($g/m^2$) of the recording medium 1100 is preferably 30 $g/m^2$ or more to 500 $g/m^2$ or less, more preferably 50 $g/m^2$ or more to 450 $g/m^2$ or less.

Recording Portion

The recording portion 1000 includes the liquid applying device 1200. The liquid applying device 1200 includes a reaction liquid applying device 1201 and an ink applying device 1202. The reaction liquid applying device 1201 illustrated in FIG. 1 is an example of a unit using an ejection head of an ink jet system. The reaction liquid applying device may be formed by utilizing a gravure coater, an offset coater, a die coater, a blade coater or the like in addition to the ejection head. The reaction liquid may be applied by the reaction liquid applying device 1201 before the application of the ink or may be applied after the ink application as long as the liquid can be brought into contact with the ink on the recording medium 1100. However, to record a high-quality image on various recording media having different liquidabsorbing characteristics, the reaction liquid is preferably applied before the application of the ink. An ejection head (recording head) of an ink jet system is used as the ink applying device 1202. Examples of the ejection system of the ejection head serving as the liquid applying device 1200 may include: a system including causing film boiling in a liquid with an electro-thermal converter to form air bubbles, to thereby eject the liquid; and a system including ejecting the liquid with an electro-mechanical converter.

The liquid applying device 1200 is a line head arranged in the Y-direction in an extended manner and its ejection orifices are arrayed in a range covering the image recording region of the recording medium having the maximum usable width. The ejection head has an ejection orifice surface 1207 (FIG. 3) having formed therein ejection orifices on its lower side (recording medium 1100 side). The ejection orifice surface faces the recording medium 1100 with a minute distance of about several millimeters therebetween.

The plurality of ink applying devices 1202 may be arranged for applying inks of respective colors to the recording medium 1100. For example, when respective color images are recorded with a yellow ink, a magenta ink, a cyan ink and a black ink, the four ink applying devices 1202 that eject the above-mentioned four kinds of inks are arranged side by side in the X-direction. The ink and the reaction liquid are hereinafter sometimes collectively referred to as "liquids".

Figure 2:
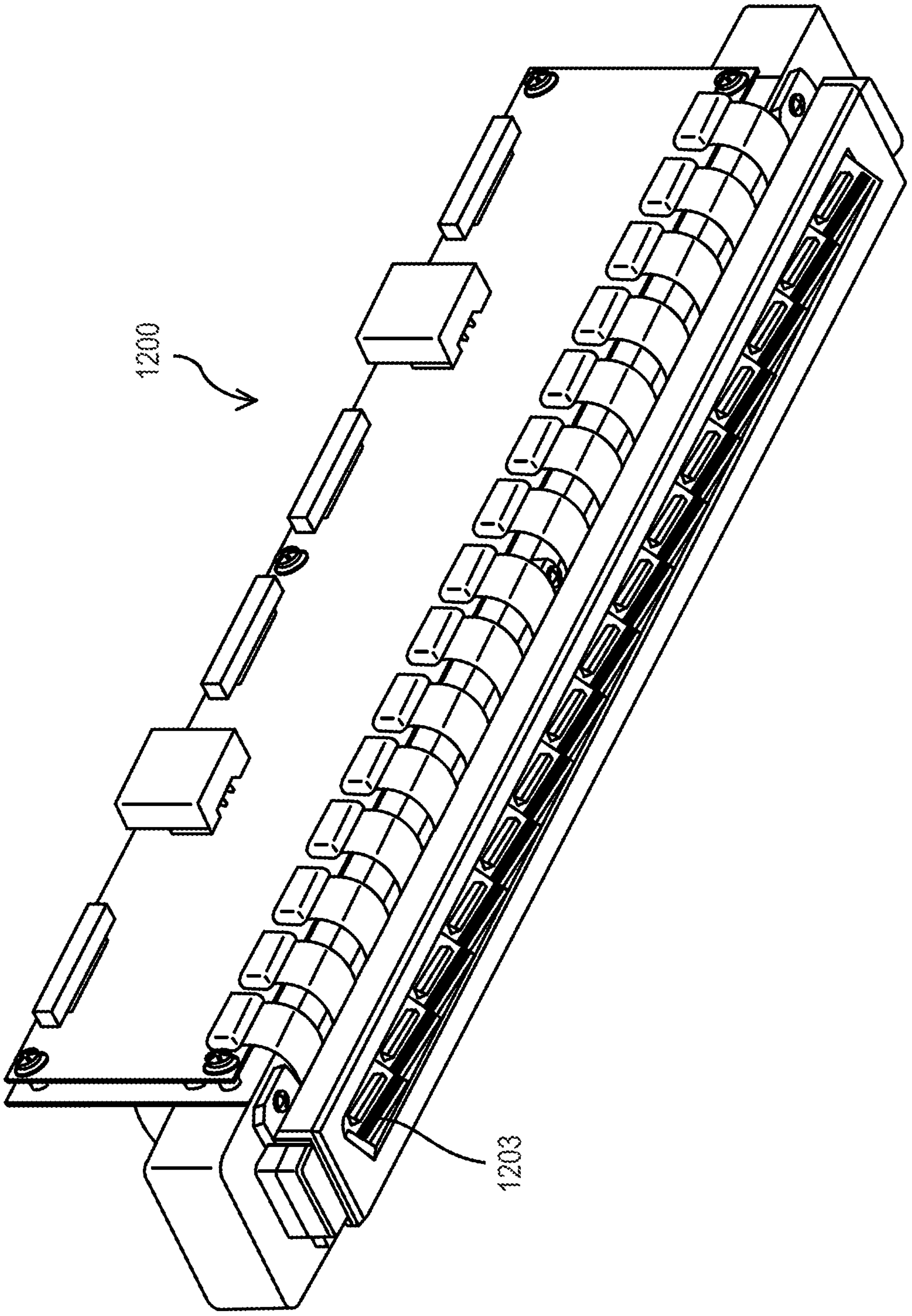
FIG. 2 is a perspective view for illustrating an example of a liquid applying device.

FIG. 2 is a perspective view for illustrating an example of the liquid applying device. The liquid applying device 1200 illustrated in FIG. 2 is a line head and a plurality of ejection element substrates 1203 having arranged therein ejection orifice arrays are linearly arrayed. The ejection element substrates 1203 each have arrayed therein a plurality of ejection orifice arrays.

Figure 3:
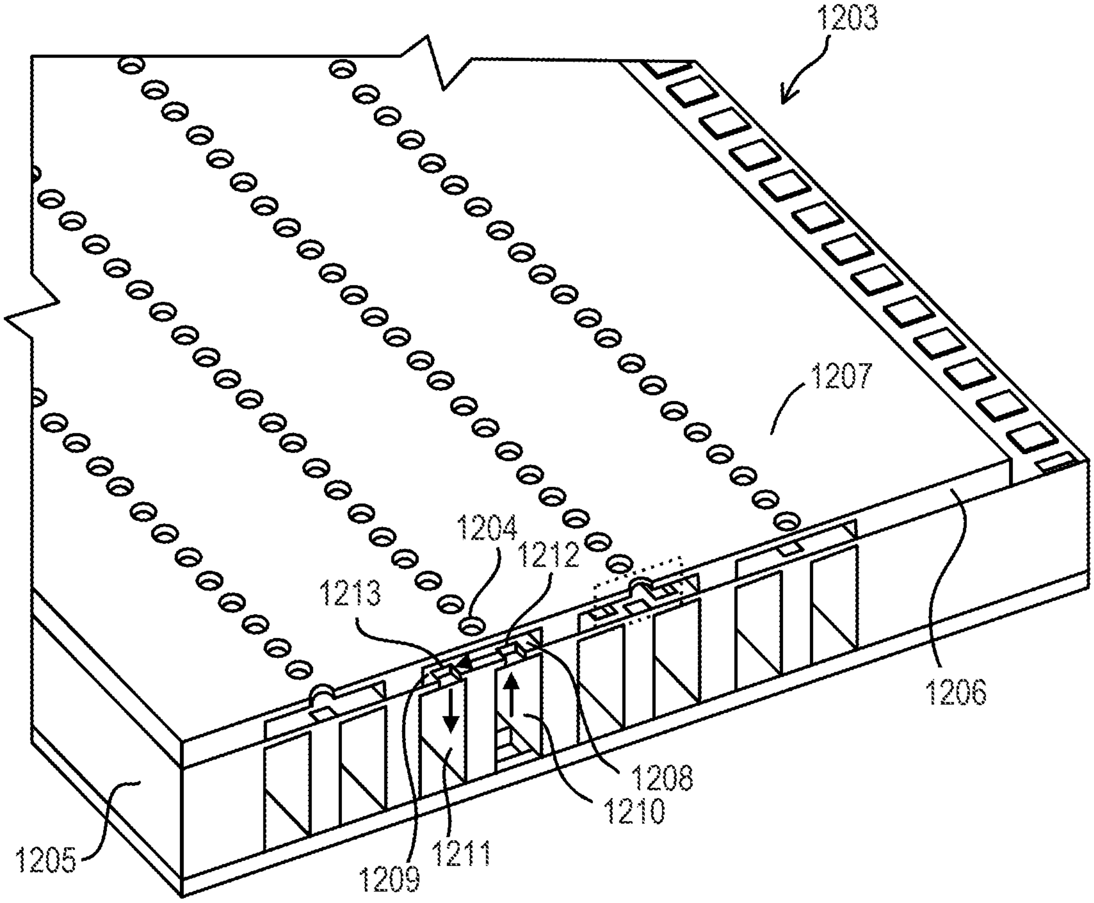
FIG. 3 is a sectional perspective view for illustrating an example of an ejection element substrate.
Figure 4:
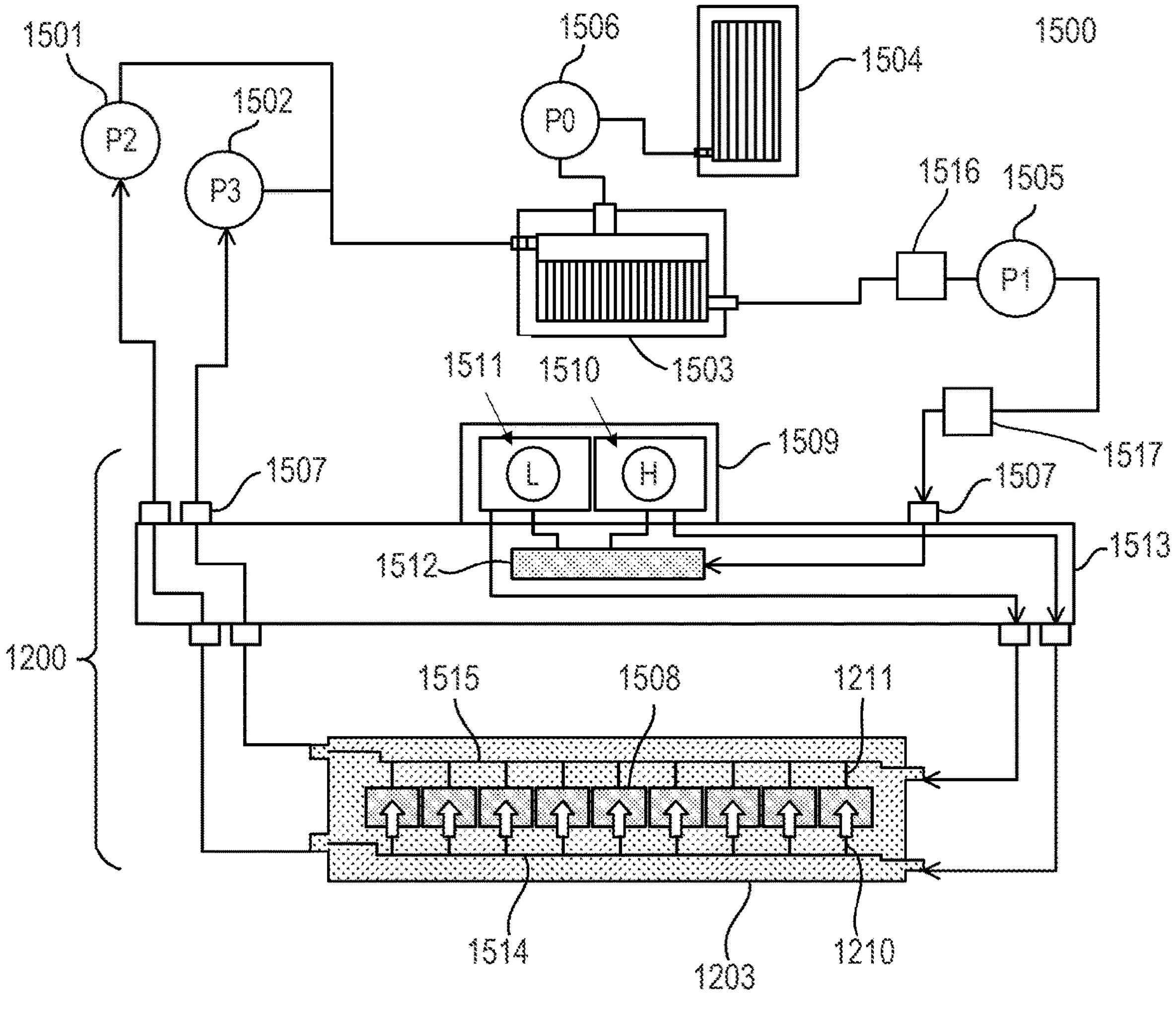
FIG. 4 is a schematic view for illustrating an example of a liquid supply system.

FIG. 3 is a sectional perspective view for illustrating an example of each of the ejection element substrates. The ejection element substrate 1203 illustrated in FIG. 3 includes: an ejection orifice forming member 1206 having opened therein ejection orifices 1204; and a substrate 1205 having arranged thereon an ejection element (not shown). The lamination of the ejection orifice forming member 1206 and the substrate 1205 forms a first flow path 1208 and a second flow path 1209 through which a liquid flows. The first flow path 1208 is a region from an inflow port 1212, into which the liquid flows from an inflow path 1210, to a portion between each of the ejection orifices 1204 and the ejection element (FIG. 4, a liquid chamber 1508). In addition, the second flow path 1209 is a region from the portion between the ejection orifice 1204 and the ejection element (FIG. 4, the liquid chamber 1508) to an outflow port 1213 from which the liquid flows out to an outflow path 1211. For example, when a pressure difference is made between the inflow port 1212 and the outflow port 1213 like the inflow port 1212 having a high pressure and the outflow port 1213 having a low pressure, the liquid can be flowed from the high pressure to the low pressure (in a direction indicated by the arrows in FIG. 3). The liquid that has passed the inflow path 1210 and the inflow port 1212 enters the first flow path 1208. Then, the liquid that has gone through the portion between the ejection orifice 1204 and the ejection element (FIG. 4, the liquid chamber 1508) flows to the outflow path 1211 via the second flow path 1209 and the outflow port 1213.

Supply System

In the recording method of the present invention, an ink jet apparatus equipped with a cooling portion for cooling an aqueous ink, a pump for circulating the ink (circulation pump), a heating portion for heating the ink and a recording head of which ejection orifice eject the ink, those constituting the ink circulation flow path and equipped in this order. FIG. 4 is a schematic view for illustrating an example of a supply system for the liquids such as the ink. A supply portion 1500 of the liquid applying device 1200 illustrated in FIG. 4 includes: a first circulation pump (high-pressure side) 1501; a first circulation pump (low-pressure side) 1502; a sub tank 1503; and a second circulation pump 1505. The sub tank 1503 connected to a main tank 1504 serving as a liquid storage portion has an air communication port (not shown) and hence can discharge air bubbles mixed into a liquid to the outside of a circulation system. The sub tank 1503 is also connected to a replenishment pump 1506. A liquid is consumed in the liquid applying device 1200 by the ejection (discharge) of the liquid from an ejection orifice in, for example, image recording or suction recovery. The replenishment pump 1506 transfers the liquid corresponding to the consumed amount from the main tank 1504 to the sub tank 1503.

The first circulation pump (high-pressure side) 1501 and the first circulation pump (low-pressure side) 1502 each flow the liquid in the liquid applying device 1200 that has been flow out of a connection portion (inflow portion) 1507 to the sub tank 1503. The second circulation pump 1505 allows the liquid flowed out of the sub tank 1503 to flow into the connection 1507 and into the liquid applying device 1200. The liquid sent out of the sub tank 1503 is cooled in the liquid cooling portion 1516 and then passes through the second circulation pump 1505 while maintaining the cooled temperature. The liquid is then heated in a liquid heating portion 1517 and flows into the connection 1507 to the liquid applying device 1200 while maintaining the heated temperature. The liquid is then ejected while still heated.

A liquid such as an ink circulates through a circulation flow path from the sub tank 1503 which corresponds to the ink storage portion (a liquid storage portion) to the liquid applying device 1200 such as a recording head. The circulation flow rate of the ink such as an ink in the circulation flow path may be appropriately determined according to the configuration of the device. Specifically, 100 mL/min or more to 800 mL/min or less is preferable and 250 mL/min or more to 700 mL/min or less is more preferable. If the circulation flow rate is less than 250 mL/min, it is difficult to decrease the viscosity of the ink at the ejection, therefore, the effect of improving the ejection stability may decrease in case that the amount of ejection is large. On the other hand, if the circulation flow rate is more than 700 mL/min, it is difficult to maintain stable flow rate (flow amount) and the ejection stability may decrease.

In the liquid cooling portion 1516, the liquid such as an ink of which temperature is raised by the liquid heating portion 1517 or the liquid applying device is cooled. By cooling the liquid, aggregation of resin particle in the liquid during passage through the second circulation pump 1505 is suppressed. In the liquid cooling portion 1516, it is preferable to cool the liquid such as an ink 15° C. or more to 30° C. or less. If the cooling temperature is lower than 15° C., the viscosity of the liquid may become too low and it becomes difficult to maintain the stable flow rate (flow amount) therefore the effect of improving the ejection stability may decrease. On the other hand, if the cooling temperature is higher than 30° C., the effect to suppress the aggregation of the resin particle in the liquid during the passage through the second circulation pump 1505 may decrease in some extent and resulting in that the effect of improving the ejection stability may decrease.

The method of cooling the liquid is not particularly limited, for example, a gas such as air; a liquid such as water; a heat dissipating member such as a heat sink; a cooling mechanism such as a chiller, a Peltier element, or a heat exchanger; a combination of these means; and so on. Above all, it is preferable from the viewpoint of efficiency and convenience to cool the ink using a heat exchanger in which a liquid (preferably water) cooled by a chiller is circulated inside. A cooling process may be provided in the liquid applying device 1200 to cool the liquid that has not been ejected from the liquid applying device 1200. However, it is preferable to equip the liquid cooling portion 1516 in the circulation flow path of the liquid as shown by FIG. 4. In particular, by providing a liquid cooling portion 1516 between the sub tank 1503 and the second circulation pump 1505, it is possible to cool the liquid including the newly supplied liquid from the main tank 1504. Furthermore, the cooling efficiency can be improved by cooling the liquid at the location close to the second circulation pump 1505. In particular, it is preferable that the liquid cooling portion 1516, the second circulation pump 1505 and the liquid heating portion 1517 are arranged successionally. That is, it is preferable to equip the cooling portion 1516, the second circulation pump 1505 and the liquid heating portion 1517 in this order without incorporating other unit such as the ink storage portion in the above succession.

By heating the liquid by the liquid heating portion 1517, ejection stability of the liquid such as an ink from the liquid applying device 1200 can be improved. The liquid can be heated at some time between passing through the second circulation pump 1505 and being ejected from the ejection unit 1508. For this reason, it is preferable to provide a liquid heating portion 1517 in the liquid circulation flow path as shown in FIG. 4. The liquid heating portion 1517 may be configured to be able to preheat by providing heating elements or the like in the middle of the inflow path 1210 of the ejection unit 1508 or around the ejection element substrate 1203. With this configuration, only a part of the liquid flowing from the common inflow path 1514 through the flow path in the ejection element substrate 1203 to the common outflow path 1515 can be heated. This keep at least some of the liquid in the ink circulation flow path from getting to be at high temperature. Therefore, it is preferable that the liquid such as an ink is heated in the middle of the inflow path 1210 of the ejection unit 1508 or around the ejection element substrate 1203 from the viewpoint of stability of liquid and suppression of evaporation of liquid components. In addition, a system using an electric-to-thermal converter may be adopted as the ejection method of the ejection head, and the ink may be heated by using the heat generated by the temperature rise of the ejection head caused by the continuous ejection of the ink. However, since it is easy to maintain the heating temperature of the ink stably, it is preferable to provide a heating means separate from the ejection head.

At the heating portion 1517, it is preferable to heat the liquid such as an ink to 35° C. or more to 55° C. or less. If the heating temperature is less than 35° C., the viscosity of the liquid such as an ink at the time of ejection tends to increase, which may reduce the effect of improving the ejection stability. On the other hand, if the heating temperature is above 55° C., the stability of the liquid such as ink tends to decrease, and the dispersion stability of resin particle may decrease when the resin particle has a certain glass transition temperature. Furthermore, since evaporation of liquid components is promoted, the effect of improving ejection stability may decrease. In order to check the temperature of the liquid such as ink flowing in the circulation flow path, a temperature detector may be provided in the circulation flow path as appropriate.

A positive-displacement pump having a quantitative liquid-delivering ability is preferably used as each of the first circulation pump (high-pressure side) 1501, the first circulation pump (low-pressure side) 1502 and the second circulation pump 1505. Examples of such positive-displacement pump may include a tube pump, a gear pump, a diaphragm pump and a syringe pump. At the time of the driving of each of the ejection element substrates 1203, the liquid can be flowed from a common inflow path 1514 to a common outflow path 1515 by the first circulation pump (high-pressure side) 1501 and the first circulation pump (low-pressure side) 1502.

A negative pressure control unit 1509 includes two pressure adjusting mechanisms in which control pressures different from each other are set. A pressure adjusting mechanism (high-pressure side) 1510 and a pressure adjusting mechanism (low-pressure side) 1511 are connected to the common inflow path 1514 and the common outflow path 1515 in the ejection element substrate 1203 via a supply unit 1513 having arranged therein a filter 1512 that removes foreign matter from a liquid, respectively. The ejection element substrate 1203 has arranged therein the common inflow path 1514, the common outflow path 1515, and the inflow path 1210 and the outflow path 1211 that communicate to the liquid chamber 1508 serving as a portion between each of the ejection orifices 1204 and the ejection element (not shown). The inflow path 1210 and the outflow path 1211 communicate to the common inflow path 1514 and the common outflow path 1515, respectively. Accordingly, a flow (arrow in FIG. 4) in which part of the liquid passes the inside of the liquid chamber 1508 from the common inflow path 1514 to flow to the common outflow path 1515 occurs. The arrows in FIG. 3 indicate the flow of the liquid in the liquid chamber 1508. That is, as illustrated in FIG. 3, the liquid in the first flow path 1208 flows to the second flow path 1209 via a space between the ejection orifice 1204 and the ejection element.

As illustrated in FIG. 4, the pressure adjusting mechanism (high-pressure side) 1510 is connected to the common inflow path 1514 and the pressure adjusting mechanism (low-pressure side) 1511 is connected to the common outflow path 1515. Accordingly, a pressure difference occurs between the inflow path 1210 and the outflow path 1211. Thus, a pressure difference also occurs between the inflow port 1212 (FIG. 3) communicating to the inflow path 1210 and the outflow port 1213 (FIG. 3) communicating to the outflow path 1211. When a liquid is flowed by the pressure difference between the inflow port 1212 and the outflow port 1213, the flow rate (mm/s) of the liquid is preferably controlled to 0.1 mm/s or more to 10.0 mm/s or less.

Conveyance System

As illustrated in FIG. 1, the recording portion 1000 includes the liquid applying device 1200 and the conveying member 1300 that conveys the recording medium 1100. The reaction liquid and the ink are applied to the desired positions of the recording medium 1100, which is conveyed by the conveying member 1300, by the liquid applying device 1200. The respective liquid applying devices receive the image signal of recorded data to apply the required reaction liquid and ink to the respective positions. Although the conveying member 1300 in the form of a conveying belt is illustrated in FIG. 1, for example, a spur or a conveying cylinder may be utilized as long as the spur or the cylinder has a function of conveying the recording medium 1100. A member that can fix the recording medium 1100 may be used as the conveying member 1300 for improving conveyance accuracy. Specific examples thereof may include: an approach including arranging holes in the conveying member 1300 and sucking the recording medium 1100 from its rear surface side to fix the medium; and an approach including forming the conveying member 1300 from an appropriate material and electrostatically adsorbing the recording medium 1100 to fix the medium.

Heating Portion

As illustrated in FIG. 1, the heating portion 2000 includes the heating device 2100 and a conveying member 2200. The recording medium 1100 having recorded thereon the image through the application of the reaction liquid and the ink is heated by the heating device 2100 while being conveyed by the conveying member 2200. Thus, the liquid components of the image are evaporated and dried. The recording method preferably further includes, between the ink applying step and the fixing step, a drying step of subjecting the recording medium having applied thereto the ink to non-contact heating to dry the ink. The presence of such drying step can effectively suppress the deformation (cockling or curl) of the recording medium 1100.

The heating device 2100 may have any configuration as long as the device can heat the recording medium 1100. Conventionally known various devices, such as a warm-air dryer and a heater, may each be used. Of those, a non-contact-type heater, such as a heating wire and an infrared heater, is preferably utilized in terms of safety and energy efficiency. In addition, the utilization of the following mechanism easily improves the drying efficiency: the mechanism has built therein a fan for jetting a heated gas on the recording medium 1100 and blows warm air thereto.

With regard to a method for the heating, the recording medium 1100 may be heated from the side of the surface (recording surface (front surface)) having applied thereto the reaction liquid and the ink, may be heated from its rear surface side or may be heated from both the surfaces. A heating function may be imparted to the conveying member 2200. Although the conveying member 2200 utilizing a conveying belt are illustrated in FIG. 1, for example, a spur or a conveying cylinder may be utilized as long as the spur or the cylinder has a function of conveying the recording medium 1100. From the viewpoint of suppressing the deformation of the recording medium 1100 by the heating, a configuration, which blows air from the heating portion 2000 to convey the recording medium 1100 while bringing the medium into close contact with the conveying member 2200, or a mechanism that fixes the recording medium to the conveying member 2200 is preferably arranged. Specific examples thereof may include: an approach including arranging holes in the conveying member 2200 and sucking the recording medium 1100 from its rear surface side to fix the medium; and an approach including forming the conveying member 2200 from an appropriate material and electrostatically adsorbing the recording medium 1100 to fix the medium.

A heating temperature is preferably set so that a liquid component may be quickly evaporated and so that the recording medium 1100 may not be overdried from the viewpoint of suppressing the deformation of the recording medium 1100. In view of a conveying speed and an environmental temperature, the temperature of a drying unit may be set so that the recording medium may have a desired temperature. Specifically, the temperature of the drying unit (e.g., warm air) is set to preferably 40° C. or more to 100° C. or less, more preferably 60° C. or more to 80° C. or less. In addition, when a heated gas is blown to heat the recording medium 1100, an air speed is preferably set to 1 m/s or more to 100 m/s or less. The temperature of air such as warm air may be measured with a K-type thermocouple thermometer. A measuring machine may be specifically, for example, a machine available under the product name "AD-5605H" (manufactured by A&D Company, Limited).

Figure 5:
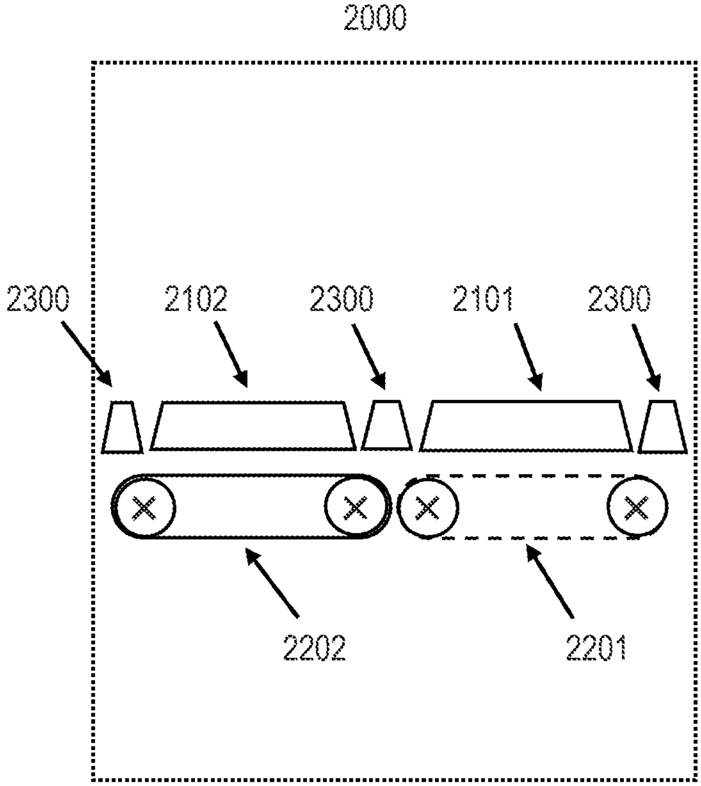
FIG. 5 is a schematic view for illustrating another example of a heating portion.

FIG. 5 is a schematic view for illustrating another example of the heating portion. Herein, a difference from the heating portion described in FIG. 1 and the foregoing is described. The heating portion 2000 illustrated in FIG. 5 includes: a first heating device 2101 and a second heating device 2102; and a first conveying member 2201 and a second conveying member 2202 arranged to face the first heating device 2101 and the second heating device 2102, respectively.

A mechanism that sucks and fixes the recording medium 1100 is not arranged in the first conveying member 2201. In addition, warm air from the first heating device 2101 presses the recording medium 1100 against the first conveying member 2201, to thereby convey the recording medium 1100. Thus, the recording medium 1100 can be delivered from the conveying member 1300 (FIG. 1) to the first conveying member 2201 and from the first conveying member 2201 to the second conveying member 2202 with high accuracy. Further, a conveyance shift due to a slight difference in conveying speed between the conveying member 1300 (FIG. 1) and the first conveying member 2201 can be reduced. Meanwhile, a conveying belt having arranged therein holes that can pass a gas therethrough is utilized as the second conveying member 2202 and the recording medium 1100 is conveyed while being fixed to the second conveying member 2202 via a suction mechanism (not shown).

Air knives 2300 are arranged between the conveying member 1300 (FIG. 1) and the first conveying member 2201, between the first conveying member 2201 and the second conveying member 2202 and between the second conveying member 2202 and a conveying member 3200 (FIG. 1), respectively. The lifting of the tip portion of the recording medium 1100, which has been conveyed, is pressed down with an air pressure from the air knives 2300. Thus, the collision of the tip portion of the recording medium 1100 with the first heating device 2101, the second heating device 2102 and the fixing member 3100 (FIG. 1) is avoided and hence the occurrence of a conveyance failure can be suppressed.

The first heating device 2101 and the second heating device 2102 may each have the same configuration as that of the above-mentioned heating device 2100. The temperatures of the first heating device 2101 and the second heating device 2102 may be identical to or different from each other. The air speeds of heated gases when the gases are blown from the devices to heat the recording medium may also be identical to or different from each other. In addition, the recording medium may be heated from the first conveying member 2201 and the second conveying member 2202 as required.

Fixing Portion

As illustrated in FIG. 1, the fixing portion 3000 is a contact-type heating and pressurizing mechanism including the fixing member 3100 serving as a fixing belt such as an endless belt and the conveying member 3200. In the fixing portion 3000, the recording medium 1100 is conveyed by the conveying member 3200. In addition, the fixing member 3100 is brought into contact with the recording medium 1100 under a state in which the medium is pressurized to heat the liquids applied to the recording medium 1100, such as the reaction liquid and the ink. Thus, an image can be fixed to the recording medium 1100. After the permeation of the liquid components of the reaction liquid and the ink into the recording medium 1100 having recorded thereon the image and the evaporation thereof from the recording medium 1100 by their passing through the heating portion 2000, the reaction liquid and the ink are fixed in the fixing portion 3000 to complete the image. When the recording medium 1100 is heated and pressurized under the state of being sandwiched between the fixing member 3100 and the conveying member 3200, the image on the recording medium 1100 and the fixing member 3100 are brought into close contact with each other and hence the image is fixed to the recording medium 1100. When a liquid such as an ink containing the resin particle and a coloring material is used, the resin particle is softened through heating mainly by the fixing portion 3000 to form a film and hence the coloring material can be bound onto the recording medium 1100.

A method of heating the fixing member 3100 may be, for example, a system including arranging a heat source such as a halogen heater in each of rollers that drive the fixing member 3100 serving as a fixing belt to heat the member. In addition, the method may be, for example, a system including arranging a heat source such as an infrared heater at a site different from the fixing member 3100 to heat the member. Further, those systems may be combined with each other. The conveying member 3200 may be heated as required. In view of a conveying speed and an environmental temperature, the temperature of the fixing member 3100 may be set so that the surface of the recording medium may have a desired temperature. Specifically, the temperature of the fixing member 3100 is set to preferably 50° C. or more to 120° C. or less, more preferably 60° C. or more to 110° C. or less. The temperature of the contact-type heating and pressurizing mechanism (fixing member 3100) and the surface temperature of the recording medium immediately after its passing through the contact-type heating and pressurizing mechanism may each be measured with a radiation thermometer. The radiation thermometer only needs to be arranged near an end portion (terminal) of the contact-type heating and pressurizing mechanism. The radiation thermometer may be specifically, for example, a thermometer available under the product name "RADIATION THERMOMETER IT-545S" (manufactured by Horiba, Ltd.).

In the case where the ink includes the resin particle, when the temperature of the fixing member 3100 is set to a temperature equal to or more than the glass transition temperature of the resin particle in the ink, the resin particle easily softens to form a film and hence the abrasion resistance of the image can be improved. When the ink includes a wax particle, the temperature of the fixing member 3100 is preferably set to be lower than the melting point of a wax for forming the wax particle. Thus, the wax that is suppressed from melting easily remains on the surface of the image and hence the abrasion resistance of the image can be improved.

A nip pressure between the fixing member 3100 and the conveying member 3200, that is, a pressure to be applied to the recording medium when the medium passes the contact-type heating and pressurizing mechanism is set to preferably 10 Pa or more to 1,000 Pa or less, more preferably 10 Pa or more to 500 Pa or less. In addition, the pressure is particularly preferably set to 10 Pa or more to 400 Pa or less. A time period (nip time) required for the recording medium to pass the contact-type heating and pressurizing mechanism is preferably 0.25 second or more to 5.0 seconds or less, more preferably 0.5 second or more to 4.0 seconds or less, particularly preferably 1.0 second or more to 3.0 seconds or less.

Figure 6:
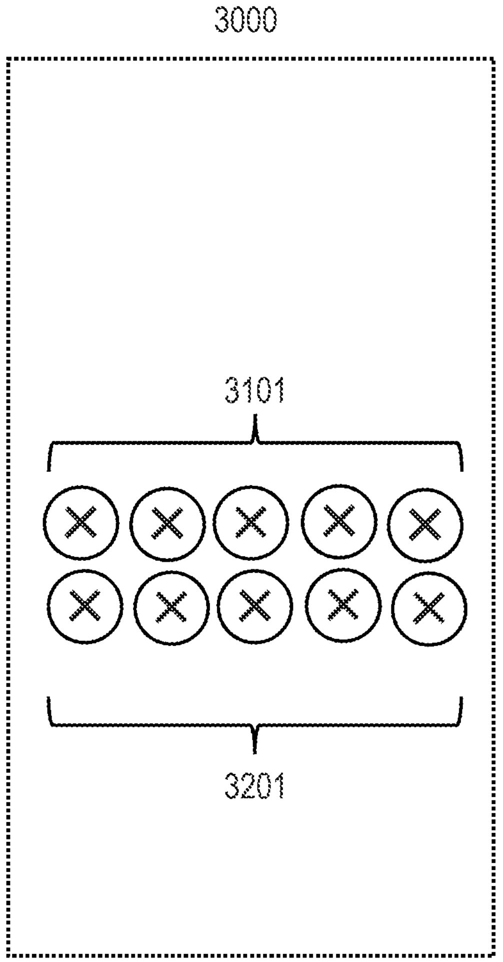
FIG. 6 is a schematic view for illustrating another example of a fixing portion.

FIG. 6 is a schematic view for illustrating another example of the fixing portion. Herein, a difference from the fixing portion described in FIG. 1 and the foregoing is described. The fixing portion 3000 illustrated in FIG. 6 is a contact-type heating and pressurizing mechanism including a plurality of fixing rollers 3101 and a plurality of conveying members 3201 arranged to face these fixing rollers 3101. When the recording medium 1100 having applied thereto the liquids such as the ink passes a space between the fixing rollers 3101 and the conveying members 3201, an image is fixed to the recording medium. The extent to which the image is fixed to the recording medium may be adjusted by controlling, for example, the numbers of the fixing rollers 3101 and the conveying members 3201, the time period for which the recording medium is nipped by the rollers and the members, a temperature and a pressure.

Cooling Portion

The cooling portion 4000 includes the cooling member 4100 and a conveying member 4200 (FIG. 1). The cooling portion 4000 cools the recording medium 1100 that has passed the heating portion 2000 and the fixing portion 3000 to have a high temperature. The cooling member 4100 may have any configuration as long as the member can cool the recording medium 1100. Approaches, such as air cooling and water cooling, may each be utilized. Of those, an approach including blowing a gas that is not heated is preferred in terms of safety and energy efficiency. In addition, the utilization of the following mechanism easily improves cooling efficiency: the mechanism has built therein a fan for jetting a gas on the recording medium 1100 and blows air thereto. In view of a conveying speed and an environmental temperature, the temperature of a cooling portion may be set so that the image of the recording medium may have a desired temperature. Specifically, the temperature of the cooling portion (e.g., blowing) is set to preferably 20° C. or more to 60° C. or less, more preferably 25° C. or more to 50° C. or less. When a gas is blown to cool the recording medium, its air speed is preferably set to 1 m/s or more to 100 m/s or less. The adoption of such conditions can suppress the deformation of the recording medium 1100 to be loaded in the sheet delivery portion 6000 to be described later and the sticking (blocking) of the image.

Reversing Portion

When double-sided recording is performed, the recording medium 1100 is reversed through utilization of the reversing portion 5000 (FIG. 1). The recording medium 1100 having the image recorded on its recording surface (front surface) passes the cooling portion 4000 and is then diverged and conveyed, followed by reversal by a reversing device 5100. The recording medium 1100 that has been reversed is conveyed to the sheet feeding device 1400 of the recording portion 1000 under a state in which the liquids are applied to its rear surface (surface opposite to the recording surface (front surface)).

Sheet Delivery Portion

The recording medium 1100 after the image recording is stored in the sheet delivery portion 6000 (FIG. 1). The recording medium 1100 that has passed the cooling portion 4000 after the performance of single-sided recording or double-sided recording is conveyed by the conveying member 6100 to be finally stored under the state of being loaded in the recording medium storage portion 6200. The two or more recording medium storage portions 6200 may be arranged for, for example, separately storing different recorded products.

Reaction Liquid

The recording method of the present invention preferably further includes, before an ink applying step, a reaction liquid applying step of applying an aqueous reaction liquid, which contains a reactant that reacts with the aqueous ink, to the recording medium. Respective components to be used in the reaction liquid and the like are described in detail below.

Reactant

The reaction liquid is brought into contact with the ink to react with the ink, to thereby aggregate components (a resin, a surfactant, and a component having an anionic group such as a self-dispersible pigment) in the ink. The reaction liquid contains the reactant. When the reactant is present, at the time of contact between the ink and the reactant in the recording medium, the state of presence of the component having an anionic group in the ink is destabilized and hence the aggregation of the ink can be accelerated. Examples of the reactant may include: a polyvalent metal ion; a cationic component such as a cationic resin; and an organic acid. The reactants may be used alone or in combination thereof.

Examples of the polyvalent metal ion forming a polyvalent metal salt may include: divalent metal ions, such as $Ca^{2+}$, $Cu^{2+}$, $Ni^{2+}$, $Mg^{2+}$, $Sr^{2+}$, $Ba^{2+}$ and $Zn^{2+}$; and trivalent metal ions, such as $Fe^{3+}$, $Cr^{3+}$, $Y^{3+}$ and $Al^{3+}$. A water-soluble polyvalent metal salt (which may be a hydrate) made up of the polyvalent metal ion and an anion bonded to each other may be used to incorporate the polyvalent metal ion into the reaction liquid. Examples of such anion may include: inorganic anions, such as $Cl^-$, $Br^-$, $I^-$, $ClO^-$, $ClO_2^-$, $ClO_2^-$, $ClO_4^-$, $NO_2^-$, $NO_3^-$, $SO_4^{2-}$, $CO_3^{2-}$, $HCO_3^-$, $PO_4^{3-}$, $HPO_4^{2-}$ and $H_2PO_4^-$; and organic anions, such as $HCOO^-$, $(COO^-)_2$, $COOH(COO^-)$, $CH_3COO^-$, $CH_3CH(OH)COO^-$, $C_2H_4(COO^-)_2$, $C_6H_5COO^-$, $C_6H_4(COO^-)_2$ and $CH_3SO_3^-$. When the polyvalent metal ion is used as the reactant, its content (% by mass) in terms of polyvalent metal salt in the reaction liquid is preferably 1.0% by mass or more to 20.0% by mass or less with respect to the total mass of the reaction liquid. In this specification, when the polyvalent metal salt is a hydrate, the "content (% by mass) of the polyvalent metal salt" in the reaction liquid means the "content (% by mass) of the anhydride of the polyvalent metal salt" obtained by removing water serving as a hydrate.

The reaction liquid containing the organic acid has a buffering capacity in an acidic region (at a pH of less than 7.0, preferably at a pH of from 2.0 to 5.0) to efficiently turn the anionic group of the components present in the ink into an acid type, to thereby aggregate the ink. Examples of the organic acid may include: monocarboxylic acids, such as formic acid, acetic acid, propionic acid, butyric acid, benzoic acid, glycolic acid, lactic acid, salicylic acid, pyrrolecarboxylic acid, furancarboxylic acid, picolinic acid, nicotinic acid, thiophenecarboxylic acid, levulinic acid and coumalic acid, and salts thereof; dicarboxylic acids, such as oxalic acid, malonic acid, succinic acid, glutaric acid, adipic acid, maleic acid, fumaric acid, itaconic acid, sebacic acid, phthalic acid, malic acid and tartaric acid, and salts and hydrogen salts thereof; tricarboxylic acids, such as citric acid and trimellitic acid, and salts and hydrogen salts thereof; and tetracarboxylic acids such as pyromellitic acid, and salts and hydrogen salts thereof. When the organic acid is used as the reactant, the content (% by mass) of the organic acid in the reaction liquid is preferably 1.0% by mass or more to 50.0% by mass or less with respect to the total mass of the reaction liquid.

Examples of the cationic resin may include resins having structures of primary to tertiary amines and resins having structures of quaternary ammonium salts. Specific examples thereof may include resins having structures of, for example, vinylamine, allylamine, vinylimidazole, vinylpyridine, dimethylaminoethyl methacrylate, ethylene imine, guanidine, diallyldimethylammonium chloride and an alkylamine-epichlorohydrin condensate. To improve solubility in the reaction liquid, the cationic resin and an acidic compound may be used in combination or the cationic resin may be subjected to quaternization treatment. When the cationic resin is used as the reactant, the content (% by mass) of the cationic resin in the reaction liquid is preferably 0.1% by mass or more to 10.0% by mass or less with respect to the total mass of the reaction liquid.

Aqueous Medium

The reaction liquid is an aqueous reaction liquid containing at least water as an aqueous medium. Examples of the aqueous medium to be used in the reaction liquid may include the same examples as those of an aqueous medium that can be incorporated into the ink to be described later. A water-soluble organic solvent to be described later that can be incorporated into the ink may be incorporated into the aqueous medium to be used in the reaction liquid. The content (% by mass) of the water-soluble organic solvent in the reaction liquid is preferably 1.0% by mass or more to 45.0% by mass or less with respect to the total mass of the reaction liquid. The water-soluble organic solvent preferably contains a specific water-soluble hydrocarbon compound to be described later. The content (% by mass) of the water-soluble hydrocarbon compound in the reaction liquid is preferably 1.0% by mass or more to 20.0% by mass or less with respect to the total mass of the reaction liquid. In addition, the content (% by mass) of the water in the reaction liquid is preferably 50.0% by mass or more to 95.0% by mass or less with respect to the total mass of the reaction liquid.

Other Component

The reaction liquid may contain various other components as required. Examples of the other components may include the same examples as those of other components that can be incorporated into the ink to be described later.

Physical Properties of Reaction Liquid

The reaction liquid is an aqueous reaction liquid to be applied to an ink jet system. Accordingly, from the viewpoint of reliability, it is preferred that the physical property values of the reaction liquid be appropriately controlled.

Specifically, the surface tension of the reaction liquid at 25° C. is preferably 20 mN/m or more to 60 mN/m or less. In addition, the viscosity of the reaction liquid at 25° C. is preferably 1.0 mPa·s or more to 10.0 mPa·s or less. The pH of the reaction liquid at 25° C. is preferably 5.0 or more to 9.5 or less, more preferably 6.0 or more to 9.0 or less.

Ink

The ink to be used in the recording method of the present invention is an aqueous ink for ink jet containing resin particle. Respective components to be used in the ink and the like are described in detail below. The ink is not necessarily to be those cured by active energy rays, such as ultraviolet rays or electron beams, and therefore it does not need to contain monomers that are polymerized upon irradiation with active energy rays.

Coloring Material

The ink preferably includes the coloring material. A pigment or a dye may be used as the coloring material. The content (% by mass) of the coloring material in the ink is preferably 0.5% by mass or more to 15.0% by mass or less, more preferably 1.0% by mass or more to 10.0% by mass or less with respect to the total mass of the ink.

Specific examples of the pigment may include: inorganic pigments, such as carbon black and titanium oxide; and organic pigments, such as azo, phthalocyanine, quinacridone, isoindolinone, imidazolone, diketopyrrolopyrrole and dioxazine pigments. The pigments may be used alone or in combination thereof.

A resin-dispersed pigment using a resin as a dispersant, a self-dispersible pigment, which has a hydrophilic group bonded to its particle surface, or the like may be used as a dispersion system for the pigment. In addition, a resin-bonded pigment having a resin-containing organic group chemically bonded to its particle surface, a microcapsule pigment, which contains a particle whose surface is covered with, for example, a resin, or the like may be used. Pigments different from each other in dispersion system out of those pigments may be used in combination. Of those, not a resin-bonded pigment or a microcapsule pigment but a resin-dispersed pigment having a resin serving as a dispersant, the resin being caused to physically adsorb to its particle surface, is preferably used.

A dispersant that can disperse the pigment in an aqueous medium through the action of an anionic group is preferably used as a resin dispersant for dispersing the pigment in the aqueous medium. A resin having an anionic group may be used as the resin dispersant and such a resin as described later, in particular, a water-soluble resin is preferably used. The mass ratio of the content (% by mass) of the pigment in the ink to the content (% by mass) of the resin dispersant therein is preferably 0.3 times or more to 10.0 times or less.

A pigment having an anionic group, such as a carboxylic acid group, a sulfonic acid group or a phosphonic acid group, bonded to its particle surface directly or through any other atomic group (—R—) may be used as the self-dispersible pigment. The anionic group may be any one of an acid type or a salt type. When the group is a salt type, the group may be in any one of a state in which part of the group dissociates or a state in which the entirety thereof dissociates. When the anionic group is a salt type, examples of a cation serving as a counterion may include an alkali metal cation, ammonium and an organic ammonium. Specific examples of the other atomic group (—R—) may include: a linear or branched alkylene group having 1 to 12 carbon atoms; an arylene group, such as a phenylene group or a naphthylene group; a carbonyl group; an imino group; an amide group; a sulfonyl group; an ester group; and an ether group. In addition, groups obtained by combining those groups may be adopted.

A dye having an anionic group is preferably used as the dye. Specific examples of the dye may include dyes, such as azo, triphenylmethane, (aza)phthalocyanine, xanthene and anthrapyridone dyes. The dyes may be used alone or in combination thereof. The coloring material is preferably a pigment, more preferably a resin-dispersed pigment or a self-dispersible pigment.

Resin

The ink contains a resin particle. By using the ink containing a resin particle, images with improved abrasion resistance can be recorded. The resin particle does not to contain a colorant. The ink may further contain an aqueous resin that can be dissolved in an aqueous medium. The resin may be added to the ink (i) for stabilizing the dispersed state of the pigment, that is, as a resin dispersant or an aid therefor. In addition, the resin may be added to the ink (ii) for improving the various characteristics of an image to be recorded.

The content (% by mass) of the resin in the ink is preferably 0.1% by mass or more to 20.0% by mass or less, more preferably 0.5% by mass or more to 15.0% by mass or less with respect to the total mass of the ink. Examples of the form of the resin may include a block copolymer, a random copolymer, a graft copolymer and a combination thereof. In addition, the resin may be a water-soluble resin that can be dissolved in an aqueous medium or may be a resin particle to be dispersed in the aqueous medium. The resins may be used alone or in combination thereof.

Composition of Resin

Examples of the resin may include an acrylic resin, a urethane-based resin and an olefin-based resin. Of those, an acrylic resin and a urethane-based resin are preferred and an acrylic resin including a unit derived from (meth)acrylic acid or a (meth)acrylate is more preferred. The resin particle formed of acrylic resin is preferable. In particular, the resin particle formed of resin having no unit with naphthalene structure are preferable in order to prevent the hydrophobicity of the resin particle from becoming too high.

A resin having a hydrophilic unit and a hydrophobic unit as its structural units is preferred as the acrylic resin. Of those, a resin having a hydrophilic unit derived from (meth) acrylic acid and a hydrophobic unit derived from at least one of a monomer having an aromatic ring and a (meth)acrylic acid ester-based monomer is preferred. A resin having a hydrophilic unit derived from (meth)acrylic acid and a hydrophobic unit derived from at least one monomer of styrene and a-methylstyrene is particularly preferred. Those resins may each be suitably utilized as a resin dispersant for dispersing the pigment because the resins each easily cause an interaction with the pigment.

The hydrophilic unit is a unit having a hydrophilic group such as an anionic group. The hydrophilic unit may be formed by, for example, polymerizing a hydrophilic monomer having a hydrophilic group. Specific examples of the hydrophilic monomer having a hydrophilic group may include: acidic monomers each having a carboxylic acid group, such as (meth)acrylic acid, itaconic acid, maleic acid and fumaric acid; and anionic monomers, such as anhydrides and salts of these acidic monomers. A cation for forming the salt of the acidic monomer may be, for example, a lithium, sodium, potassium, ammonium or organic ammonium ion. The hydrophobic unit is a unit free of a hydrophilic group such as an anionic group. The hydrophobic unit may be formed by, for example, polymerizing the hydrophobic monomer free of a hydrophilic group such as anionic group. Specific examples of the hydrophobic monomer may include: monomers each having an aromatic ring, such as styrene, α-methylstyrene and benzyl (meth)acrylate; and (meth)acrylic acid ester-based monomers, such as methyl (meth)acrylate, butyl (meth)acrylate and 2-ethylhexyl (meth)acrylate.

The urethane-based resin may be obtained by, for example, causing a polyisocyanate and a polyol to react with each other. In addition, a chain extender may be further caused to react with the reaction product. Examples of the olefin-based resin may include polyethylene and polypropylene.

Properties of Resin

The phrase "resin is water-soluble" as used herein means that when the resin is neutralized with an alkali whose amount is equivalent to its acid value, the resin is present in an aqueous medium under a state in which the resin does not form any particle whose particle diameter may be measured by a dynamic light scattering method. Whether or not the resin is water-soluble can be judged in accordance with the following method. First, a liquid (resin solid content: 10% by mass) containing the resin neutralized with an alkali (e.g., sodium hydroxide or potassium hydroxide) corresponding to its acid value is prepared. Next, the prepared liquid is diluted with pure water tenfold (on a volume basis) to prepare a sample solution. Then, when no particle having a particle diameter is measured at the time of the measurement of the particle diameter of the resin in the sample solution by the dynamic light scattering method, the resin can be judged to be water-soluble. Measurement conditions at this time may be set, for example, as follows: SetZero: 30 seconds; number of times of measurement: 3; and measurement time: 180 seconds. In addition, a particle size analyzer based on the dynamic light scattering method (e.g., an analyzer available under the product name "UPA-EX150" from Nikkiso Co., Ltd.) or the like may be used as a particle size distribution measuring device. Of course, the particle size distribution measuring device to be used, the measurement conditions and the like are not limited to the foregoing.

The acid value of the water-soluble resin is preferably 100 mgKOH/g or more to 250 mgKOH/g or less. The weight-average molecular weight of the water-soluble resin is preferably 3,000 or more to 15,000 or less.

The glass transition temperature (Tg) of the resin particle is preferably 50° C. or more to 90° C. or less. If the glass transition temperature (Tg) of the resin particle is less than 50° C., the state of the resin particle tends to become unstable when the ink is heated, which may reduce the effect of improving the ink ejection stability. On the other hand, if the glass transition temperature (Tg) of the resin particle is more than 90° C., it may become difficult to form a film, resulting in a decrease in the image strength in some extent, which may reduce the effect of improving the abrasion resistance. When the ink further contains a wax particle described below, the glass transition temperature (Tg) of the resin particle is preferably lower than the melting point of the wax particle. The glass transition temperature (° C.) of the resin particle may be measured with a differential scanning calorimeter (DSC). The glass transition temperature of the resin particle in the ink can be measured using a differential scanning calorimeter, for example, after the resin particle are separated by ultracentrifugation of the ink, washed and dried.

The anionic group amount of the resin particle is preferably 70 μmol/g or more to 400 μmol/g or less. When the anionic group amount of the resin particle is less than 70 μmol/g, the dispersion state of the resin particle tends to be slightly unstable, which may reduce the effect of improving the ink ejection stability. On the other hand, when the anionic group amount of the resin particle is more than 400 μmol/g, the amount of ions present in the ink may increase due to the resin particle, which may reduce the effect of improving the ink ejection stability. The anionic group amount of resin particle can be measured by colloidal titration. In the example described later, the anionic group amount of the resin particle in a water dispersion liquid of a resin particle was measured by colloidal titration using an automatic potentiometric titration device (Product name: AT-510, manufactured by Kyoto Electronics) equipped with a flow potential titration unit (PCD-500). Specifically, the water dispersion liquid of the resin particle was properly diluted with pure water, the pH was adjusted to about 10 with potassium hydroxide if necessary, and potentiometric titration was performed using 5 mmol/L methyl glycol chitosan as a titrant. Needless to say, it is also possible to measure the anionic group amount from resin particle extracted from ink in a suitable manner.

The weight-average molecular weight of the resin for forming the resin particle is preferably 1,000 or more to 3,000,000 or less, more preferably 100,000 or more to 3,000,000 or less. The volume-based 50% cumulative particle diameter ($D_{50}$) of the resin particle measured by a dynamic light scattering method is preferably 50 nm or more to 500 nm or less. The volume-based 50% cumulative particle diameter of the resin particle is the diameter of the particle in a particle diameter cumulative curve at which the ratio of the particle integrated from small particle diameters reaches 50% with respect to the total volume of the measured particle. The volume-based 50% cumulative particle diameter of the resin particle may be measured with the above-mentioned particle size analyzer of a dynamic light scattering system and under the above-mentioned measurement conditions. The volume-based 50% cumulative particle diameter ($D_{50}$) of a resin particle in ink can be measured, for example, by using the particle size distribution measuring device after washing and drying the resin particle collected by ultracentrifugation of the ink. It can also be similarly measured by using a water dispersion liquid of a resin particle used to prepare the ink.

Wax Particle

A particle formed of a wax (wax particle) may be incorporated into the ink. By using an ink containing the wax particle, it is possible to suppress the aggregation of resin particle, and even if the ink is circulated for a long time, the ejection stability of the ink can be further improved. The presence of a wax particle as a spacer between the resin particles suppresses the aggregation of resin particles, which is thought to further improve the ejection stability of the ink. In addition, the use of the ink including the wax particle can record an image further improved in abrasion resistance. The wax in this specification may be a composition blended with a component except the wax or may be the wax itself. The wax particle may be dispersed with a dispersant, such as a surfactant or a resin. The waxes may be used alone or in combination thereof. The content (% by mass) of the wax particle in the ink is preferably 0.1% by mass or more to 10.0% by mass or less, more preferably 1.0% by mass or more to 5.0% by mass or less with respect to the total mass of the ink.

The wax is an ester of a higher monohydric or dihydric alcohol that is insoluble in water and a fatty acid in a narrow sense. Accordingly, animal-based waxes and plant-based waxes are included in the category of the wax but oils and fats are not included therein. High-melting point fats, mineral-based waxes, petroleum-based waxes and blends and modified products of various waxes are included therein in a broad sense. In the present invention, the waxes in a broad sense may each be used without any particular limitation. The waxes in a broad sense may be classified into natural waxes, synthetic waxes, blends thereof (blended waxes) and modified products thereof (modified waxes).

Examples of the natural wax may include: animal-based waxes, such as beeswax, a spermaceti wax and lanolin; plant-based waxes, such as a Japan wax, a carnauba wax, a sugar cane wax, a palm wax, a candelilla wax and a rice wax; mineral-based waxes such as a montan wax; and petroleum-based waxes, such as a paraffin wax, a microcrystalline wax and petrolatum. Examples of the synthetic wax may include hydrocarbon-based waxes, such as a Fischer-Tropsch wax and polyolefin waxes (e.g., polyethylene wax and polypropylene wax). The blended waxes are mixtures of the above-mentioned various waxes. The modified waxes are obtained by subjecting the above-mentioned various waxes to modification treatment, such as oxidation, hydrogenation, alcohol modification, acrylic modification or urethane modification. The above-mentioned waxes may be used alone or in combination thereof. The wax is preferably at least one kind selected from the group consisting of: a microcrystalline wax; a Fischer-Tropsch wax; a polyolefin wax; a paraffin wax; and modified products and blends thereof. Of those, a blend of a plurality of kinds of waxes is more preferred and a blend of a petroleum-based wax and a synthetic wax is particularly preferred.

The wax is preferably a solid at normal temperature (25° C.). The melting point (° C.) of the wax is preferably 40° C. or higher to 150° C. or lower and more preferably 70° C. or higher to 130° C. or lower. If the melting point (° C.) of the wax is lower than 70° C., due to the effect of heat upon heating the ink, the function of the wax particle existing between the resin particles as spacers is slightly reduced, which may reduce the effect of improving the ink ejection stability. In particular, the melting point (° C.) of the wax is preferably 50° C. or higher to 100° C. The melting point of the wax may be measured in conformity with a test method described in the section 5.3.1 (Melting Point Testing Method) of JIS K 2235:1991 (Petroleum Waxes). In the cases of a microcrystalline wax, petrolatum and a mixture of a plurality of kinds of waxes, their melting points may be measured with higher accuracy by utilizing a test method described in the section 5.3.2 thereof. The melting point of the wax is susceptible to characteristics, such as a molecular weight (a larger molecular weight provides a higher melting point), a molecular structure (a linear structure provides a higher melting point but a branched structure provides a lower melting point), crystallinity (higher crystallinity provides a higher melting point) and a density (a higher density provides a higher melting point). Accordingly, the control of those characteristics can provide a wax having a desired melting point. The melting point of the wax in the ink may be measured, for example, as follows: after the wax fractionated by subjecting the ink to ultracentrifugation treatment has been washed and dried, its melting point is measured in conformity with each of the above-mentioned test methods.

Aqueous Medium

The ink to be used in the recording method of the present invention is an aqueous ink including at least water as an aqueous medium. An aqueous medium that is the water or a mixed solvent of the water and a water-soluble organic solvent may be incorporated into the ink. Deionized water or ion-exchanged water is preferably used as the water. The content (% by mass) of the water in the aqueous ink is preferably 50.0% by mass or more to 95.0% by mass or less with respect to the total mass of the ink. In addition, the content (% by mass) of the water-soluble organic solvent in the aqueous ink is preferably 2.0% by mass or more to 40.0% by mass or less with respect to the total mass of the ink. Solvents that may be used in an ink for ink jet, such as alcohols, (poly)alkylene glycols, glycol ethers, nitrogen-containing solvents and sulfur-containing solvents, may each be used as the water-soluble organic solvent. The water-soluble organic solvents may be used alone or in combination thereof.

Water-soluble Hydrocarbon Compound

The water-soluble organic solvent to be incorporated into the ink preferably contains a specific water-soluble hydrocarbon compound. The water-soluble hydrocarbon compound is a compound having a hydrocarbon chain having 3 or more carbon atoms, the compound being substituted with 2 or more hydrophilic groups each selected from the group consisting of: a hydroxy group; an amino group; and an anionic group. However, the hydrocarbon chain may be interrupted by a sulfonyl group or an ether group. When the number of the carbon atoms of the hydrocarbon chain is 3 or 4, the hydrophilic groups include an anionic group or the hydrocarbon chain is interrupted by a sulfonyl group.

In the present invention, a hydrocarbon compound in the state of being dissolved in water at a content of the compound in the ink at 25° C. is defined as being "water-soluble". That is, the solubility of the compound in water at 25° C. is larger than the content thereof in the ink. The fact that the hydrocarbon chain is interrupted by a sulfonyl group or an ether group means that a sulfonyl group ($-S(=O)_2-$) or an ether group ($-O-$) is present in the middle of the hydrocarbon chain. The water-soluble hydrocarbon compound has hydrogen-bonding groups, such as a hydroxy group, an amino group, an anionic group, a sulfonyl group and an ether group. Accordingly, the use of the ink including the hydrocarbon compound can suppress the cockling or curl of a recording medium having recorded thereon an image. A general hydrocarbon compound having a hydrocarbon chain having a relatively small number of carbon atoms (3 or 4 carbon atoms) tends to have a small molecular weight and hence have a low vapor pressure. However, the above-mentioned water-soluble hydrocarbon compound has a hydrogen-bonding anionic group or its hydrocarbon chain is interrupted by a sulfonyl group. Accordingly, the compound hardly evaporates owing to an intermolecular or intramolecular interaction and hence remains between fibers for forming the recording medium to exhibit a suppressing action on the cockling or the curl. The content (% by mass) of the water-soluble hydrocarbon compound in the ink is preferably 1.0% by mass or more to 20.0% by mass or less with respect to the total mass of the ink.

The number of the carbon atoms of the hydrocarbon chain for forming the water-soluble hydrocarbon compound is preferably 3 or more to 50 or less, more preferably 3 or more to 10 or less. Examples of the anionic group may include a sulfonic acid group and a carboxylic acid group. Specific examples of the water-soluble hydrocarbon compound may include: alkanediols, such as 1,5-pentanediol and 1,6-hexanediol; amino acids, such as alanine, β-alanine, trimethylglycine, amidosulfuric acid (alias: sulfamic acid), aminomethanesulfonic acid, taurine (alias: 2-aminoethanesulfonic acid), carbamic acid, glycine, aspartic acid, glutamic acid, sulfanilic acid or salts of any of the acids described above, phenylalanine, leucine, isoleucine, threonine, tryptophan, valine, methionine, lysine and arginine; sulfonyl compounds such as bis(2-hydroxyethyl) sulfone; alkylene glycols, such as triethylene glycol, tetraethylene glycol, tripropylene glycol and a polyethylene glycol having a number-average molecular weight of from about 200 to about 1,000; and sugars, such as sorbitol, D-sorbitol, xylitol, trehalose, fructose and D(+)-xylose. The water-soluble hydrocarbon compounds may be used alone or in combination thereof.

Other Component

The ink may include various other components as required. Examples of other components may include various additives, such as an antifoaming agent, a surfactant, a pH adjustor, a viscosity modifier, a rust inhibitor, an antiseptic, a fungicide, an antioxidant and an anti-reducing agent. However, the ink is preferably free of the reactant to be incorporated into the reaction liquid.

Physical Properties of Ink

The ink is an aqueous ink to be applied to an ink jet system. Accordingly, from the viewpoint of reliability, it is preferred that the physical property values of the ink be appropriately controlled. Specifically, the surface tension of the ink at 25° C. is preferably 20 mN/m or more to 60 mN/m or less, more preferably 30 mN/m or more to 50 mN/m or less. In addition, the viscosity of the ink at 25° C. is preferably 1.0 mPa·s or more to 10.0 mPa·s or less. The pH of the ink at 25° C. is preferably 7.0 or more to 9.5 or less, more preferably 8.0 or more to 9.5 or less.

EXAMPLES

The present invention is described in more detail below by way of Examples and Comparative Examples. The present invention is by no means limited to Examples below without departing from the gist of the present invention. "Part(s)" and "%" with regard to the description of the amounts of components are by mass unless otherwise stated.

Preparation of Reaction Liquid

Respective components (Unit: %) shown in Table 1 were mixed and sufficiently stirred, followed by filtration with a cellulose acetate filter having a pore size of 3.0 pin (manufactured by Advantec) under pressure. Thus, respective reaction liquids were prepared. In Table 1, the term "CATIOMASTER PDT-2" represents the product name of "Dimethylamine Epichlorohydrin Condensate Aqueous Solution" of a cationic resin manufactured by Yokkaichi Chemical, and its resin content is 60.0%. "ACETYLENOL E100" is the trade name of a surfactant manufactured by Kawaken Fine Chemical Co., Ltd.

TABLE 1

Compositions of reaction liquids

| | Reaction Liquid 1 | Reaction Liquid 2 | Reaction Liquid 3 |
|---|---|---|---|
| Magnesium Sulphate heptahydrate | 15.0 | | |
| Catiomaster PDT-2 | | 1.7 | |
| Succinic acid | | | 7.5 |
| Glycerin | 8.0 | 8.0 | 8.0 |
| Acetylenol E100 | 1.0 | 1.0 | 1.0 |
| Ion-exchanged water | 76.0 | 89.3 | 83.5 |

Preparation of Pigment Dispersion Liquid

Pigment Dispersion Liquid 1

A styrene-ethyl acrylate-acrylic acid copolymer (resin 1) having an acid value of 150 mg KOH/g and a weight-average molecular weight of 8,000 was prepared. 20.0 Parts of the resin 1 was neutralized with potassium hydroxide whose molar amount was equivalent to its acid value. In addition, an appropriate amount of pure water was added to the neutralized product to prepare an aqueous solution of the resin 1 in which the content of the resin (solid content) was 20.0%. 20.0 Parts of a pigment (C.I. Pigment Blue 15:3), 50.0 parts of the aqueous solution of the resin 1 and 30.0 parts of ion-exchanged water were mixed to provide a mixture. The resultant mixture was subjected to 50 passes of dispersion treatment with a nanomizer (manufactured by Yoshida Kikai Co., Ltd.) at a pressure of 150 MPa. After that, the treated product was centrifuged at a number of revolutions of 5,000 rpm for 30 minutes so that a coarse particle was removed. The residue was filtered with a cellulose acetate filter having a pore size of 3.0 μm (manufactured by Advantec) under pressure to prepare a pigment dispersion liquid 1 in which the content of the pigment was 20.0% and the content of the resin dispersant (resin 1) was 10.0%.

Pigment Dispersion Liquid 2

A pigment dispersion liquid 2 having a pigment content of 20.0% and a resin dispersant (Resin 1) content of 10.0% was prepared by the same procedure as that of the above-mentioned pigment dispersion liquid 1 except that the pigment was changed to C.I. Pigment Red 122.

Pigment Dispersion Liquid 3

A pigment dispersion liquid 3 having a pigment content of 20.0% and a resin dispersant (Resin 1) content of 10.0% was prepared by the same procedure as that of the above-mentioned pigment dispersion liquid 1 except that the pigment was changed to C.I. Pigment Yellow 74.

Pigment Dispersion Liquid 4

A pigment dispersion liquid 4 having a pigment content of 20.0% and a resin dispersant content of 10.0% was prepared by the same procedure as that of the above-mentioned pigment dispersion liquid 1 except that the pigment was changed to carbon black.

Pigment Dispersion Liquid 5

An aqueous solution obtained by dissolving 5.0 g of concentrated hydrochloric acid in 5.5 g of ion-exchanged water was brought into the state of being cooled to 5° C., followed by the addition of 1.5 g of 4-aminophthalic acid to the solution. A container containing the aqueous solution was loaded into an ice bath, and while the solution was stirred so that its temperature was held at 10° C. or less, a solution obtained by dissolving 0.9 g of sodium nitrite in 9.0 g of ion-exchanged water at 5° C. was added thereto. After the mixture had been stirred for 15 minutes, 6.0 g of carbon black was added to the mixture under stirring and the whole was further stirred for 15 minutes to provide a slurry. The resultant slurry was filtered with filter paper (product name: "STANDARD FILTER PAPER No. 2," manufactured by Advantec), and particle remaining on the filter paper were sufficiently washed with water and dried in an oven at 110° C. After that, a sodium ion was substituted with a potassium ion by an ion exchange method. Thus, a self-dispersion pigment in which a —$C_6H_3$—$(COOK)_2$ group was bonded to the particle surface of the pigment was obtained. An appropriate amount of pure water was added to adjust the content of the pigment. Thus, a pigment dispersion liquid 5 having a pigment content of 20.0% was obtained.

Preparation of Resin Particle

Resin Particles 1 to 9

0.2 Part of potassium persulfate and 74.0 parts of ion-exchanged water were mixed to prepare a solution. An emulsion was also prepared by mixing methyl methacrylate (MMA), ethyl methacrylate (EMA), n-butyl methacrylate (nBMA), methacrylic acid (MAA), and a reactive surfactant in the amounts shown in Table 2 (breakdown (parts) of the added monomers). A surfactant available under the product name "ADEKA REASOAP ER-20" (manufactured by Adeka Corporation, nonionic surfactant, number of moles of ethylene oxide groups: 20) was used as the reactive surfactant. Under a nitrogen atmosphere, the emulsion was dropped into the solution over 1 hour and was polymerized while the mixture was stirred at 80° C. After that, the polymer was further stirred for 2 hours. After the polymer had been cooled to room temperature, ion-exchanged water and an aqueous solution of potassium hydroxide were added to the polymer to provide a water dispersion liquid of resin particle in which the content of the resin particle was 25.0%. Table 2 shows the volume-based 50% cumulative particle diameter ($D_{50}$ (nm)) of each of the resin particles, the glass transition temperature (Tg (° C.)) of the resin particle, and the anionic group amount (μmol/g) of each of the resin particles in the obtained aqueous dispersion. The methods of measuring the volume-based 50% cumulative particle diameter ($D_{50}$ (nm)) of each of the resin particles, the glass transition temperature (Tg (° C.)) of the resin particle and the anionic group amount (μmol/g) of the resin particle are as follows.

Volume-based 50% Cumulative Particle Diameter of Resin Particle

The water dispersion liquid of each of the resin particle was diluted with pure water. Thus, a liquid containing the resin particle in which the content of the resin particle was 1.0% was prepared as a measurement sample. The volume-based 50% cumulative particle diameter ($D_{50}$ (nm)) of the resin particle in the measurement sample was measured with a particle size distribution meter based on a dynamic light scattering method (product name: "NANOTRAC UPA-EX150", manufactured by Nikkiso Co., Ltd.). Measurement conditions were set as follows: SetZero: 30 seconds; number of times of measurement: 3; measurement time: 180 seconds; shape: perfect spherical shape; and refractive index: 1.6.

Glass Transition Temperature of Resin Particle

A resin obtained by drying the water dispersion liquid of each of the resin particle was prepared as a sample. A temperature increase cycle in which the temperature of the resin was increased from −70° C. to 180° C. at a rate of 10° C./min with a differential scanning calorimeter (product name: "Q200", manufactured by TA Instruments) was performed twice to measure the glass transition temperature (Tg (° C.)) of the resin particle.

Anionic Group Amount of Resin Particle

The anionic group amount of resin particle (μmol/g) was measured by potentiometric titration with methyl glycol chitosan as a titrant using an automatic potentiometric titration device (product name: AT-510, manufactured by Kyoto Electronics Manufacturing Co., Ltd.) equipped with a flow potential titration unit (PCD-500).

TABLE 2

Conditions for production of resin particle and their property

| Resin particle | Breakdown of the added monomers (parts) | | | | | Property | | |
|---|---|---|---|---|---|---|---|---|
| | MMA | EMA | nBMA | MAA | Reactive surfactant | $D_{50}$ (nm) | Tg (° C.) | Anionic group amount (μmol/g) |
| 1 | | 19.00 | 5.00 | 1.50 | 0.30 | 100 | 60 | 220 |
| 2 | | 3.00 | 10.00 | 1.50 | 0.30 | 100 | 40 | 220 |
| 3 | | 14.00 | 10.00 | 1.50 | 0.30 | 100 | 50 | 220 |
| 4 | 19.50 | | 4.50 | 1.50 | 0.30 | 100 | 90 | 220 |
| 5 | 22.00 | | 2.00 | 1.50 | 0.30 | 100 | 100 | 220 |
| 6 | | 19.00 | 5.00 | 0.20 | 0.30 | 100 | 55 | 60 |

TABLE 2-continued

| Conditions for production of resin particle and their property | | | | | | | | |
|---|---|---|---|---|---|---|---|---|
| | Breakdown of the added monomers (parts) | | | | | Property | | |
| Resin particle | MMA | EMA | nBMA | MAA | Reactive surfactant | $D_{50}$ (nm) | Tg (° C.) | Anionic group amount (μmol/g) |
| 7 | | 19.00 | 5.00 | 0.25 | 0.30 | 100 | 55 | 70 |
| 8 | | 19.00 | 5.00 | 3.30 | 0.30 | 100 | 65 | 400 |
| 9 | | 19.00 | 5.00 | 3.50 | 0.30 | 100 | 65 | 410 |

Preparation of Ink

Respective components (unit: %) shown in Table 3-1 and 3-2 were mixed and sufficiently stirred, followed by filtration with a cellulose acetate filter having a pore size of 3.0 μm (manufactured by Advantec) under pressure. Thus, respective inks were prepared. A numerical value attached to polyethylene glycol is the number-average molecular weight of the polyethylene glycol. In Table 3-1 and Table 3-2, the term "SURFYNOL 440" represents the product name of a surfactant manufactured by Shin-Etsu Chemical Co., Ltd. In addition, details of the water dispersion liquid of each wax particle used are also shown below.

Water dispersion liquid of Wax particle 1: trade name "AQUACER 539," manufactured by BYK Chemie, melting point: 95° C., content of wax particle: 35%

Water dispersion liquid of Wax particle 2: trade name "AQUACER 497," manufactured by BYK Chemie, melting point: 60° C., content of wax particle: 50%

Water dispersion liquid of Wax particle 3: trade name "SELOSOL R-582," manufactured by Chukyo Yushi Co., Ltd., melting point: 70° C., content of wax particle: 30%

Water dispersion liquid of Wax particle 4: trade name "AQUACER 552, manufactured by BYK Chemie, melting point: 130° C., content of wax particle: 35%

Water dispersion liquid of Wax particle 5: trade name "AQUACER 515," manufactured by BYK Chemie, melting point: 135° C., content of wax particle: 35%

TABLE 3-1

| Composition of Inks | | | | | | | | | | | |
|---|---|---|---|---|---|---|---|---|---|---|---|
| | Ink | | | | | | | | | | |
| | 1 | 2 | 3 | 4 | 5 | 6 | 7 | 8 | 9 | 10 | 11 |
| Pigment dispersion liquid 1 | 20.00 | | | | | 20.00 | 20.00 | 20.00 | 20.00 | 20.00 | 20.00 |
| Pigment dispersion liquid 2 | | 20.00 | | | | | | | | | |
| Pigment dispersion liquid 3 | | | 20.00 | | | | | | | | |
| Pigment dispersion liquid 4 | | | | 20.00 | | | | | | | |
| Pigment dispersion liquid 5 | | | | | 20.00 | | | | | | |
| Water dispersion liquid of Resin particle 1 | 40.00 | 40.00 | 40.00 | 40.00 | 40.00 | | | | | | |
| Water dispersion liquid of Resin particle 2 | | | | | | 40.00 | | | | | |
| Water dispersion liquid of Resin particle 3 | | | | | | | 40.00 | | | | |
| Water dispersion liquid of Resin particle 4 | | | | | | | | 40.00 | | | |
| Water dispersion liquid of Resin particle 5 | | | | | | | | | 40.00 | | |
| Water dispersion liquid of Resin particle 6 | | | | | | | | | | 40.00 | |
| Water dispersion liquid of Resin particle 7 | | | | | | | | | | | 40.00 |
| Water dispersion liquid of Resin particle 8 | | | | | | | | | | | |
| Water dispersion liquid of Resin particle 9 | | | | | | | | | | | |
| Water dispersion liquid of Wax particle 1 | 2.86 | 2.86 | 2.86 | 2.86 | 2.86 | 2.86 | 2.86 | 2.86 | | 2.86 | 2.86 |
| Water dispersion liquid of Wax particle 2 | | | | | | | | | | | |
| Water dispersion liquid of Wax particle 3 | | | | | | | | | | | |

TABLE 3-1-continued

| Composition of Inks | Ink | | | | | | | | | | |
|---|---|---|---|---|---|---|---|---|---|---|---|
| | 1 | 2 | 3 | 4 | 5 | 6 | 7 | 8 | 9 | 10 | 11 |
| Water dispersion liquid of Wax particle 4 | | | | | | | | | 2.86 | | |
| Water dispersion liquid of Wax particle 5 | | | | | | | | | | | |
| Glycerin | 19.00 | 19.00 | 19.00 | 19.00 | 19.00 | 19.00 | 19.00 | 19.00 | 19.00 | 19.00 | 19.00 |
| 1,2-hexanediol | 1.00 | 1.00 | 1.00 | 1.00 | 1.00 | 1.00 | 1.00 | 1.00 | 1.00 | 1.00 | 1.00 |
| SURFYNOL 440 | 0.50 | 0.50 | 0.50 | 0.50 | 0.50 | 0.50 | 0.50 | 0.50 | 0.50 | 0.50 | 0.50 |
| Ion-exchanged water | 16.64 | 16.64 | 16.64 | 16.64 | 16.64 | 16.64 | 16.64 | 16.64 | 16.64 | 16.64 | 16.64 |

TABLE 3-2

| Composition of Inks | Ink | | | | | | | | | |
|---|---|---|---|---|---|---|---|---|---|---|
| | 12 | 13 | 14 | 15 | 16 | 17 | 18 | 19 | 20 | 21 |
| Pigment dispersion liquid 1 | 20.00 | 20.00 | 20.00 | 20.00 | 20.00 | 20.00 | 20.00 | 20.00 | 20.00 | 20.00 |
| Pigment dispersion liquid 2 | | | | | | | | | | |
| Pigment dispersion liquid 3 | | | | | | | | | | |
| Pigment dispersion liquid 4 | | | | | | | | | | |
| Pigment dispersion liquid 5 | | | | | | | | | | |
| Water dispersion liquid of Resin particle 1 | | | 44.00 | | 40.00 | 40.00 | 40.00 | | | |
| Water dispersion liquid of Resin particle 2 | | | | | | | | | | |
| Water dispersion liquid of Resin particle 3 | | | | 40.00 | | | | | | |
| Water dispersion liquid of Resin particle 4 | | | | | | | | 40.00 | | |
| Water dispersion liquid of Resin particle 5 | | | | | | | | | | |
| Water dispersion liquid of Resin particle 6 | | | | | | | | | | |
| Water dispersion liquid of Resin particle 7 | | | | | | | | | | |
| Water dispersion liquid of Resin particle 8 | 40.00 | | | | | | | | | |
| Water dispersion liquid of Resin particle 9 | | 40.00 | | | | | | | | |
| Water dispersion liquid of Wax particle 1 | 2.86 | 2.86 | | | | | | | | 2.86 |
| Water dispersion liquid of Wax particle 2 | | | | 2.00 | | | | | | |
| Water dispersion liquid of Wax particle 3 | | | | | 3.33 | | | 3.33 | | |
| Water dispersion liquid of Wax particle 4 | | | | | | 2.86 | | | | |
| Water dispersion liquid of Wax particle 5 | | | | | | | 2.86 | | | |
| Glycerin | 19.00 | 19.00 | 19.00 | 19.00 | 19.00 | 19.00 | 19.00 | 19.00 | 19.00 | 19.00 |
| 1,2-hexanediol | 1.00 | 1.00 | 1.00 | 1.00 | 1.00 | 1.00 | 1.00 | 1.00 | 1.00 | 1.00 |
| SURFYNOL 440 | 0.50 | 0.50 | 0.50 | 0.50 | 0.50 | 0.50 | 0.50 | 0.50 | 0.50 | 0.50 |
| Ion-exchanged water | 16.64 | 16.64 | 15.50 | 17.50 | 16.17 | 16.64 | 16.64 | 16.17 | 59.50 | 56.64 |

Evaluation

The ink jet recording apparatus 100 having a configuration illustrated in FIG. 1 was prepared. A reaction liquid and a type of ink shown in Table 4 were respectively loaded into the reaction liquid applying device and the ink applying device of the apparatus. Then, the ink was circulated according to the evaluation conditions shown in Table 4, and the ink was ejected to record the image on the recording medium to evaluate the ejection stability of the ink and the abrasion resistance of the image. The cooling was performed using a heat exchanger in which water cooled by a chiller was circulated inside. The heating was also performed using a heater provided on the ejection head separately from the ejection element. In the present invention, in evaluation criteria for each of the following items, while ranks "A" and "B" were defined as acceptable levels, a rank "C" was defined as an unacceptable level. The evaluation results are shown in Table 4. "Circulation route" in Table 4 is as follow.

1: Cooling portion=>Pump=>Heating portion=>Ejection
2: Pump=>Cooling portion=>Heating portion=>Ejection
3: Heating portion=>Pump=>Cooling portion=>Ejection

Ejection Stability

Each ink was circulated in an ink circulation flow path according to the evaluation conditions shown in Table 3. While the ink was kept circulating, an evaluation in which a pattern (nozzle check pattern) was recorded once a day to check the ejection status from all the ejection orifice was continued for two months, and at the end of two months, the ejection stability of the ink was evaluated according to the evaluation criteria shown below.

A: At the end of two months, the ink was being ejected from all the ejection orifices.
B: At the end of two months, the percentage of the ejection orifices that did not eject was 0.1% or less.
C: At the end of two months, the percentage of the ejection orifices that did not eject was more than 0.1%.

Abrasion Resistance

Each ink was circulated in an ink circulation flow path according to the evaluation conditions shown in Table 4. With the ink circulating, a solid image of 1.5 cm×13 cm size was recorded on a recording medium (Trade name: OK Topcoat +, basis weight: 127.9 g/m$^2$, manufactured by Oji Paper) with 2 g/m$^2$ of reaction liquid and 8 g/m$^2$ of ink. In the heating portion, the image was fixed on the recording medium at a temperature of 80° C. with a hot air blowing on the medium for 2 seconds, and in the fixing portion, the image was fixed at 85° C. with a nip pressure of 20 Pa and a nip time of 2 seconds. After the recorded image was left in an environment of 25° C. and 55% relative humidity for 24 hours, the image was rubbed 10 times with a load of 500 g using the Gakushin type friction resistance test (Product name: AB-301, manufactured by Tester Industries). A recording medium of the same type as the recording medium on which the image was recorded was pasted on the friction element portion as a recording medium for evaluation. The surface of the image after friction and the surface of the recording medium for evaluation were visually observed, and the abrasion resistance of the image was evaluated according to the evaluation criteria described below.

A: The image was fixed on the recording medium and the white background of the recording medium was not visible, and the recording medium for evaluation had no dirt.
B: The image was fixed on the recording medium and the white background of the recording medium was not visible, but the recording medium for evaluation had dirt.
C: The image was peeled off from the recording medium and the white background of the recording medium was visible.

TABLE 4

Evaluation conditions and evaluation results

| | | Evaluation condition: Ink | Cooling temperature (° C.) | Heating temperature (° C.) | Circulation flow rate (mL/min) | Circulation route | Reaction liquid | Evaluation result: Ejection stability | Evaluation result: Abration resistance |
|---|---|---|---|---|---|---|---|---|---|
| Example | 1 | 1 | 20 | 40 | 450 | 1 | 1 | A | A |
| | 2 | 1 | 20 | 40 | 450 | 1 | 2 | A | A |
| | 3 | 1 | 20 | 40 | 450 | 1 | 3 | A | A |
| | 4 | 2 | 20 | 40 | 450 | 1 | 1 | A | A |
| | 5 | 3 | 20 | 40 | 450 | 1 | 1 | A | A |
| | 6 | 4 | 20 | 40 | 450 | 1 | 1 | A | A |
| | 7 | 5 | 20 | 40 | 450 | 1 | 1 | A | A |
| | 8 | 1 | 20 | 40 | 200 | 1 | 1 | B | A |
| | 9 | 1 | 20 | 40 | 250 | 1 | 1 | A | A |
| | 10 | 1 | 20 | 40 | 700 | 1 | 1 | A | A |
| | 11 | 1 | 20 | 40 | 750 | 1 | 1 | B | A |
| | 12 | 1 | 12 | 40 | 450 | 1 | 1 | B | A |
| | 13 | 1 | 15 | 40 | 450 | 1 | 1 | A | A |
| | 14 | 1 | 30 | 40 | 450 | 1 | 1 | A | A |
| | 15 | 1 | 33 | 40 | 450 | 1 | 1 | B | A |
| | 16 | 1 | 20 | 32 | 450 | 1 | 1 | B | A |
| | 17 | 1 | 20 | 35 | 450 | 1 | 1 | A | A |
| | 18 | 1 | 20 | 55 | 450 | 1 | 1 | A | A |
| | 19 | 1 | 20 | 58 | 450 | 1 | 1 | B | A |
| | 20 | 6 | 20 | 40 | 450 | 1 | 1 | B | A |
| | 21 | 7 | 20 | 40 | 450 | 1 | 1 | A | A |
| | 22 | 8 | 20 | 40 | 450 | 1 | 1 | A | A |
| | 23 | 9 | 20 | 40 | 450 | 1 | 1 | A | B |
| | 24 | 10 | 20 | 40 | 450 | 1 | 1 | B | A |
| | 25 | 11 | 20 | 40 | 450 | 1 | 1 | A | A |
| | 26 | 12 | 20 | 40 | 450 | 1 | 1 | A | A |
| | 27 | 13 | 20 | 40 | 450 | 1 | 1 | B | A |
| | 28 | 14 | 20 | 40 | 450 | 1 | 1 | B | B |
| | 29 | 15 | 20 | 40 | 450 | 1 | 1 | A | B |
| | 30 | 16 | 20 | 40 | 450 | 1 | 1 | A | A |

TABLE 4-continued

Evaluation conditions and evaluation results

| | | Ink | Cooling temperature (° C.) | Heating temperature (° C.) | Circulation flow rate (mL/min) | Circulation route | Reaction liquid | Ejection stability | Abration resistance |
|---|---|---|---|---|---|---|---|---|---|
| | 31 | 17 | 20 | 40 | 450 | 1 | 1 | A | A |
| | 32 | 18 | 20 | 40 | 450 | 1 | 1 | A | B |
| | 33 | 19 | 20 | 40 | 450 | 1 | 1 | A | B |
| Comparative example | 1 | 1 | None | 40 | 450 | 1 | 1 | C | A |
| | 2 | 1 | 20 | None | 450 | 1 | 1 | C | A |
| | 3 | 1 | 20 | 40 | 450 | 2 | 1 | C | A |
| | 4 | 1 | 20 | 40 | 450 | 3 | 1 | C | A |
| | 5 | 20 | 20 | 40 | 450 | 1 | 1 | A | C |
| | 6 | 21 | 20 | 40 | 450 | 1 | 1 | A | C |
| | 7 | 20 | None | 40 | 450 | 1 | 1 | A | C |
| | 8 | 21 | None | 40 | 450 | 1 | 1 | A | C |

According to the present invention, there can be provided the ink jet recording method that can record an image with good ink ejection stability and excellent abrasion resistance while circulating ink for a long period of time from the ink storage portion to the recording head. In addition, according to the present invention, the ink jet recording apparatus and the aqueous ink to be used in the ink jet recording method can be provided.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2022-151700, filed Sep. 22, 2022, and Japanese Patent Application No. 2023-143896, filed Sep. 5, 2023, which are hereby incorporated by reference herein in their entirety.

What is claimed is:

1. An ink jet recording method comprising a recording step of ejecting an aqueous ink from a recording head to apply the aqueous ink to a recording medium to record an image, wherein the ink jet recording method uses an ink jet recording apparatus equipped with an ink circulation flow path for circulating the aqueous ink from an ink storage portion to the recording head, with the ink jet recording apparatus comprising the ink storage portion for storing the aqueous ink, the recording head of an ink jet system for ejecting the aqueous ink, a cooling portion for cooling the aqueous ink, a heating portion for heating the aqueous ink, and a pump for circulating the aqueous ink, wherein the cooling portion, the pump, the heating portion, and the recording head, which together constitute the ink circulation flow path, are equipped in this order, such that the aqueous ink flows through the ink circulation flow path in this order, with the aqueous ink flowing from the cooling portion to the pump, such that an ink storage portion is not provided between the cooling portion and the pump, wherein the cooling portion is provided separately from the ink storage portion, wherein the method further includes a step of supplying the aqueous ink cooled in the cooling portion to the pump, and wherein the aqueous ink comprises a resin particle.

2. The ink jet recording method according to claim 1, wherein a circulation flow rate of the aqueous ink in the ink circulation flow path is 250 mL/min or more to 700 mL/min or less.

3. The ink jet recording method according to claim 1, wherein the aqueous ink is cooled to 15° C. or more to 30° C. or less in the cooling portion.

4. The ink jet recording method according to claim 1, wherein the aqueous ink is heated to 35° C. or more to 55° C. or less in the heating portion.

5. The ink jet recording method according to claim 1, wherein a glass transition temperature of the resin particle is 50° C. or more to 90° C. or less.

6. The ink jet recording method according to claim 1, wherein an anionic group amount of the resin particle is 70 μmol/g or more to 400 μmol/g or less.

7. The ink jet recording method according to claim 1, wherein the aqueous ink further comprises a wax particle.

8. The ink jet recording method according to claim 7, wherein a melting temperature of the wax particle is 70° C. or more to 130° C. or less.

9. The ink jet recording method according to claim 7, wherein a glass transition temperature of the resin particle is lower than a melting temperature of the wax particle.

10. The ink jet recording method according to claim 1, wherein the cooling portion is a heat exchanger in which a liquid cooled by a chiller is circulated inside.

11. The ink jet recording method according to claim 1, wherein the heating portion is provided separately from the recording head.

12. The ink jet recording method according to claim 1, wherein the recording head includes an ejection system configured to cause film boiling in the aqueous ink with an electro-thermal converter to form air bubbles, to thereby eject the aqueous ink.

13. The ink jet recording method according to claim 1, wherein the recording head is a line head.

14. The ink jet recording method according to claim 1, wherein the resin particle is formed of an acrylic resin.

15. The ink jet recording method according to claim 1, wherein the aqueous ink further comprises a coloring material.

16. The ink jet recording method according to claim 1, wherein the recording medium has a permeability of the aqueous ink.

17. The ink jet recording method according to claim 1, wherein the recording medium has no permeability of the aqueous ink.

18. The ink jet recording method according to claim 1, wherein the cooling portion and the pump are arranged successively.

19. The ink jet recording method according to claim 1, wherein each of the cooling portion and the pump is arranged upstream of the recording head.

20. An ink jet recording apparatus comprising an ink circulation flow path for circulating an aqueous ink from an ink storage portion to a recording head, the ink jet recording apparatus further comprising the ink storage portion for storing the aqueous ink, the recording head of an ink jet system for ejecting the aqueous ink, a cooling portion for cooling the aqueous ink, a heating portion for heating the aqueous ink, and a pump for circulating the aqueous ink, wherein the cooling portion, the pump, the heating portion, and the recording head, which together constitute the ink circulation flow path, are equipped in this order, such that the aqueous ink flows through the ink circulation flow path in this order, with the aqueous ink flowing from the cooling portion to the pump, such that an ink storage portion is not provided between the cooling portion and the pump, wherein the cooling portion is provided separately from the ink storage portion, wherein the apparatus is configured to supply the aqueous ink cooled in the cooling portion to the pump, and wherein the aqueous ink comprises a resin particle.

* * * * *